US012578553B2

(12) United States Patent  
Seo

(10) Patent No.: US 12,578,553 B2  
(45) Date of Patent: Mar. 17, 2026

(54) LENS ASSEMBLY AND ELECTRONIC DEVICE INCLUDING THE SAME

(71) Applicant: Samsung Electronics Co., Ltd., Gyeonggi-do (KR)

(72) Inventor: Jungpa Seo, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 497 days.

(21) Appl. No.: 17/992,051

(22) Filed: Nov. 22, 2022

(65) Prior Publication Data

US 2023/0176336 A1 Jun. 8, 2023

Related U.S. Application Data

(63) Continuation of application No. PCT/KR2022/014346, filed on Sep. 26, 2022.

(30) Foreign Application Priority Data

Dec. 8, 2021 (KR) ........................ 10-2021-0174912  
Jan. 3, 2022 (KR) ........................ 10-2022-0000134

(51) Int. Cl.  
*G02B 13/00* (2006.01)  
*G02B 9/64* (2006.01)  
(Continued)

(52) U.S. Cl.  
CPC ........... *G02B 13/0045* (2013.01); *G02B 9/64* (2013.01); *G03B 30/00* (2021.01); *G03B 13/34* (2013.01)

(58) Field of Classification Search  
CPC ...... G02B 13/0045; G02B 9/64; G02B 13/04; G03B 30/00; G03B 13/34; G03B 17/12  
See application file for complete search history.

(56) References Cited

U.S. PATENT DOCUMENTS

2017/0108662 A1 4/2017 Lee  
2018/0196234 A1 7/2018 Chang et al.  
(Continued)

FOREIGN PATENT DOCUMENTS

CN 109270667 A 1/2019  
CN 110554484 A 12/2019  
(Continued)

OTHER PUBLICATIONS

Extended European Search Report dated Dec. 9, 2024.  
(Continued)

*Primary Examiner* — Mariam Qureshi  
(74) *Attorney, Agent, or Firm* — Sughrue Mion, PLLC

(57) ABSTRACT

According to an embodiment of the present disclosure, a lens assembly may include at least seven lenses sequentially arranged from an object side to an image sensor side, where a first lens may have negative refractive power and may include a concave object side surface and a convex image sensor side surface, a second lens may have positive refractive power and may include an object side surface and an image sensor side surface at least one of which is aspherical, a third lens may have positive refractive power, one of the second lens and the third lens may have a refractive index of 1.6 or more, the refractive index of the seventh lens disposed seventh from the side may be 1.6 or more, and the lens assembly may have a half-field angle of 50 degrees or more. Various other embodiments are possible.

20 Claims, 14 Drawing Sheets

(51) Int. Cl.
   *G03B 30/00* (2021.01)
   *G03B 13/34* (2021.01)

(56) References Cited

U.S. PATENT DOCUMENTS

| | | | |
|---|---|---|---|
| 2018/0314036 A1 | 11/2018 | Li | |
| 2019/0154974 A1 | 5/2019 | Chen | |
| 2020/0233180 A1 | 7/2020 | Hsueh et al. | |
| 2020/0249434 A1 | 8/2020 | Lin et al. | |
| 2021/0088755 A1 | 3/2021 | Nitta | |
| 2021/0255428 A1* | 8/2021 | Lin | G02B 13/04 |
| 2022/0003962 A1 | 1/2022 | Sun et al. | |
| 2022/0011541 A1 | 1/2022 | Sun | |
| 2022/0066146 A1* | 3/2022 | Huang | G02B 13/0045 |
| 2022/0196977 A1* | 6/2022 | Lai | G02B 3/04 |
| 2023/0063258 A1 | 3/2023 | Zou et al. | |

FOREIGN PATENT DOCUMENTS

| | | | |
|---|---|---|---|
| CN | 111458836 A | 7/2020 | |
| CN | 111505811 A | 8/2020 | |
| CN | 111538136 A | 8/2020 | |
| CN | 111665612 A | 9/2020 | |
| CN | 108279472 B | 3/2021 | |
| CN | 113138458 A | 7/2021 | |
| CN | 113176656 A | 7/2021 | |
| CN | 113625430 A | 11/2021 | |
| CN | 113741005 A | 12/2021 | |
| JP | 2015-72404 A | 4/2015 | |
| KR | 10-1837371 B1 | 3/2018 | |
| KR | 10-1859383 B1 | 5/2018 | |
| WO | 2021/128138 A1 | 7/2021 | |

OTHER PUBLICATIONS

Modern Lens Design; XP 55152035 A.
International Search Report dated Jan. 4, 2023.
Written Opinion dated Jan. 4, 2023.

* cited by examiner

LENS ASSEMBLY AND ELECTRONIC DEVICE INCLUDING THE SAME

CROSS-REFERENCE TO RELATED APPLICATION(S)

This application is a continuation application, claiming priority under § 365 (c), of an International application No. PCT/KR2022/014346, which was filed on Sep. 26, 2022, and claims priority to Korean Patent Applications No. 10-2021-0174912 and 10-2022-0000134, filed on Dec. 8, 2021 and Jan. 3, 2022, respectively, in the Korean Intellectual Property Office, the disclosures of all of which are incorporated by reference herein in their entireties.

BACKGROUND

Technical Field

One or more embodiments of the instant disclosure generally relate to a lens assembly, such as a lens assembly including a plurality of lenses, as well as an electronic device including the lens assembly.

Description of Related Art

Optical device assemblies, for example, cameras capable of capturing images or videos have been widely used, and recently digital cameras or video cameras each having a solid-state image sensor such as a charge coupled device (CCD) or complementary metal-oxide semiconductor (CMOS) have become common. Optical devices with solid image sensors (CCD or CMOS) are gradually replacing film-type optical devices because it is easier to store, reproduce, and transmit images using solid-state optical devices compared to the film-type optical devices.

Recently, a plurality of optical devices (e.g., two or more cameras such as close-up cameras, telephoto cameras, and/or wide-angle cameras) have been implemented in a single electronic device to improve the quality of captured images and to provide various visual effects to the captured images. For example, images of an object may be acquired via a plurality of cameras having different optical characteristics, and the images may be synthesized so as to produce high-quality captured images. By being equipped with a plurality of optical devices (e.g., cameras) to acquire high-quality captured images, electronic devices such as mobile communication terminals and smartphones are gradually replacing electronic devices specialized for photographing functions, such as digital compact cameras. Further, it is expected that the electronic devices such as mobile communication terminals and smartphones can replace high-performance cameras such as single-lens reflex digital cameras.

The above-described information may be provided as background for the purpose of helping understanding of the disclosure of the disclosure. No claim or determination is made as to whether any of the foregoing may be applied as prior art with respect to the disclosure.

SUMMARY

In a high-performance camera such as a single-lens reflex digital camera, a large-sized image sensor of approximately 1/1.2 inches to 1 inches may be used, and the better performance of the camera accordingly improves the quality of captured images. Typically, the improvements are in proportion to the size of the image sensor. In such a high-performance camera, by including a lens assembly corresponding to the size and performance of the image sensor, it is possible to prevent deterioration of image quality by controlling peripheral field curvature or aberration. For example, in order to achieve improvement in terms of field curvature or to control aberration while matching the designed performance of the enlarged image sensor, the size of the lenses constituting the lens assembly may be enlarged or the number of lenses may be increased. However, since the number of lenses of the optical system may be limited in a miniaturized electronic device such as a smartphone, it may be difficult to provide a lens assembly that matches the performance of the enlarged image sensor. For example, when a limited number of (e.g., about seven) lenses are provided, miniaturization may be easily achieved, but it may be difficult to implement a lens assembly having wide angle characteristic and low distortion rate.

According to an embodiment of the present disclosure, a lens assembly and/or an electronic device including the same may include at least seven lenses sequentially arranged along an optical axis direction from an object side to an image sensor side, wherein a first lens disposed first from the object side may have negative refractive power and may include a concave object side surface and a convex image sensor side surface, a second lens disposed second from the object side may have positive refractive power and may include an object side surface and an image sensor side surface, at least one of which is aspherical, and a third lens disposed third from the object side may have positive refractive power, and wherein the lens assembly may satisfy Conditional Expressions 1, 2, and 3 below.

$$N23 \geq 1.6 \qquad \text{[Conditional Expression 1]}$$

$$N7 \geq 1.6 \qquad \text{[Conditional Expression 2]}$$

$$HFOV \geq 50° \qquad \text{[Conditional Expression 3]}$$

Here, "N23" may be a refractive index of one of the second lens and the third lens, "N7" may be a refractive index of a seventh lens disposed seventh from the object side, and "HFOV" may be a half angle of view of the lens assembly in "degrees".

According to an embodiment of the present disclosure, a lens assembly and/or an electronic device including the same may include at least seven lenses sequentially arranged along an optical axis direction from an object side to an image sensor side, wherein a first lens disposed first from the object side may have negative refractive power and may include a concave object side surface and a convex image sensor side surface, a second lens disposed second from the object side may have positive refractive power and may include an object side surface and an image sensor side surface, at least one of which is aspherical, and a third lens disposed third from the object side may have positive refractive power, and wherein the lens assembly may satisfy Conditional Expressions 4, 5, and 6 below.

$$N2 \geq 1.6 \qquad \text{[Conditional Expression 4]}$$

$$N7 \geq 1.6 \qquad \text{[Conditional Expression 5]}$$

$$HFOV \geq 50° \qquad \text{[Conditional Expression 6]}$$

Here, "N2" may be the refractive index of the second lens.

According to an embodiment of the present disclosure, the electronic device may include at least seven lenses sequentially arranged along an optical axis direction from an object side to an image sensor side, an image sensor aligned with the at least seven lenses on the optical axis direction and configured to receive light focused or guided by the at least seven lenses, and a processor configured to acquire an image based on the light received from the image sensor, wherein a first lens disposed first from the object side may have negative refractive power and may include a concave object side surface and a convex image sensor side surface, a second lens disposed second from the object side may have positive refractive power and may include an object side surface and an image sensor side surface, at least one of which is aspherical, and a third lens disposed third from the object side may have positive refractive power, and wherein the electronic device may satisfy Conditional Expressions 7, 8, and 9 below.

$$N23 \geq 1.6 \qquad \text{[Conditional Expression 7]}$$

$$N7 \geq 1.6 \qquad \text{[Conditional Expression 8]}$$

$$HFOV \geq 50° \qquad \text{[Conditional Expression 9]}$$

Additional aspects according to various embodiments will be presented through a detailed description set forth below, and may in part become apparent from the description or be understood through presented implementation embodiments.

BRIEF DESCRIPTION OF THE DRAWINGS

The above-described aspects or other aspects, configurations, and/or advantages regarding embodiments of the disclosure may become more apparent through the following detailed description made with reference to the accompanying drawings.

Throughout the appended drawings, like reference numerals may be assigned to like parts, components, and/or structures.

DETAILED DESCRIPTION

An embodiment of the disclosure is intended to at least solve the above-described problems and/or disadvantages and provide at least the advantages described below, and may provide a lens assembly having wide-angle characteristic while including a limited number of lenses and/or an electronic device including the lens assembly.

An embodiment of the disclosure is able to provide a lens assembly having wide angle characteristic while it is miniaturized. The lens assembly may also provide easy aberration control. An electronic device including the lens assembly is also disclosed.

According to an embodiment of the present disclosure, a lens assembly and/or an electronic device including the same can be easily miniaturized by including a limited number of (e.g., seven) lenses. In addition, it is easy to perform aberration control by controlling the refractive index of one of the second lens and the third lenses from the object side and/or the seventh lens from the object side so that improvement can be achieved in terms of distortion rate (e.g., field curvature). In some embodiments, even though a limited number of lenses are included, through refractive index control, it is possible to facilitate aberration control while providing wide-angle characteristics for large-sized image sensors of approximately 1/1.2 inches or larger. In addition, various effects recognized directly or indirectly through this document may be provided.

The following description made with reference to the appended drawings may provide an understanding of various exemplary implementations of the disclosure, including the claims and their equivalents. An exemplary embodiment disclosed in the following description include various specific details to help understanding, but is considered to be one of various embodiments. Accordingly, it will be apparent to those skilled in the art that various changes and modifications of the various implementations described herein can be made without departing from the scope and spirit of the disclosure. In addition, descriptions of well-known functions and configurations may be omitted for clarity and brevity.

The terms and words used in the following description and claims are not limited to a bibliographical meaning, but may be used to clearly and consistently describe the various embodiments of the disclosure. Therefore, it will be obvious to those skilled in the art that the following description of various implementations of the disclosure is provided for the purpose of explanation, not for the purpose of limiting the disclosure defined as the scope of rights and equivalents thereto.

It should be understood that the singular forms of "a", "an", and "the" contain plural meanings, unless the context clearly indicates otherwise. Thus, for example, "a component surface" may be understood to include one or more of the surfaces of a component.

Figure 1:
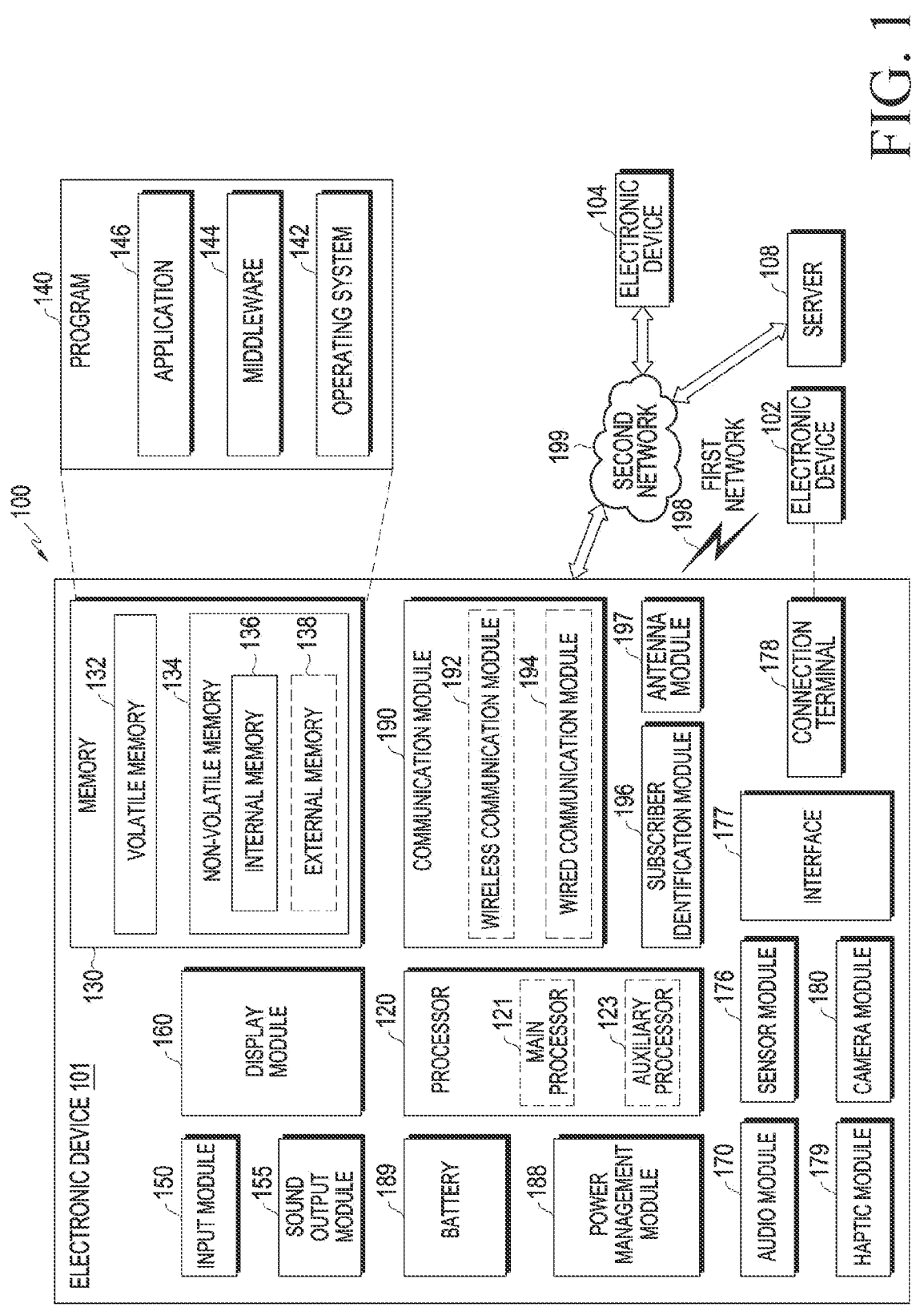
FIG. 1 is a block diagram illustrating an electronic device according to an embodiment of the disclosure within a network environment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
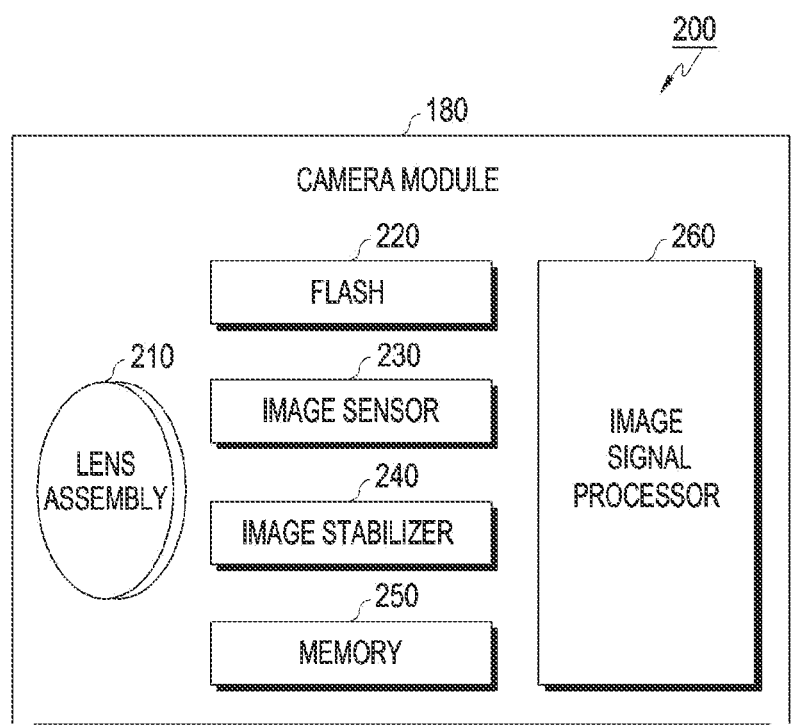
FIG. 2 is a block diagram exemplifying a camera module according to an embodiment.

FIG. 2 is a block diagram 200 illustrating a camera module 280 (e.g., the camera module 180 of FIG. 1) according to an embodiment. Referring to FIG. 2, the camera module 280 may include a lens assembly 210, a flash 220, an image sensor 230, an image stabilizer 240, memory 250 (e.g., buffer memory), or an image signal processor 260.

In some embodiments, the lens assembly 210 may include the image sensor 230. The lens assembly 210 may collect light emitted or reflected from an object whose image is to be taken. The lens assembly 210 may include one or more lenses. According to an embodiment, the camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal.

According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 280 or the electronic device 201 including the camera module 280. This allows compensating for at least part of a negative effect (e.g., image blurring) by the movement on an image being captured. According to an embodiment, the image stabilizer 240 may sense such a movement by the camera module 280 or the electronic device (e.g., the electronic device 101 of FIG. 1) using a gyro sensor (not shown) or an acceleration sensor (not shown) disposed inside or outside the camera module 280. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160 of FIG. 1. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of a memory (e.g., the memory 130 of FIG. 1) or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control, read-out timing control, or the like) with respect to at least one (e.g., the image sensor 230) of the components included in the camera module 280. An image processed by the image signal processor 260 may be stored back in the memory 250 for further processing, or may be provided to an external component (e.g., the memory 130, the display module 160, the electronic device 102, the electronic device 104, or the server 108 of FIG. 1) outside the camera module 280. According to an embodiment, the image signal processor 260 may be configured as at least part of a processor (e.g., the processor 120 of FIG. 1), or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device (e.g., the electronic device 101 of FIG. 1) may include a plurality of camera modules 280 having different attributes or functions. In such a case, at least one of the plurality of camera modules 280 may form, for example, a wide-angle camera and at least another of the plurality of camera modules 280 may form a telephoto camera. Similarly, at least one of the plurality of camera modules may form, for example, a front camera and at least another of the plurality of camera modules may form a rear camera.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
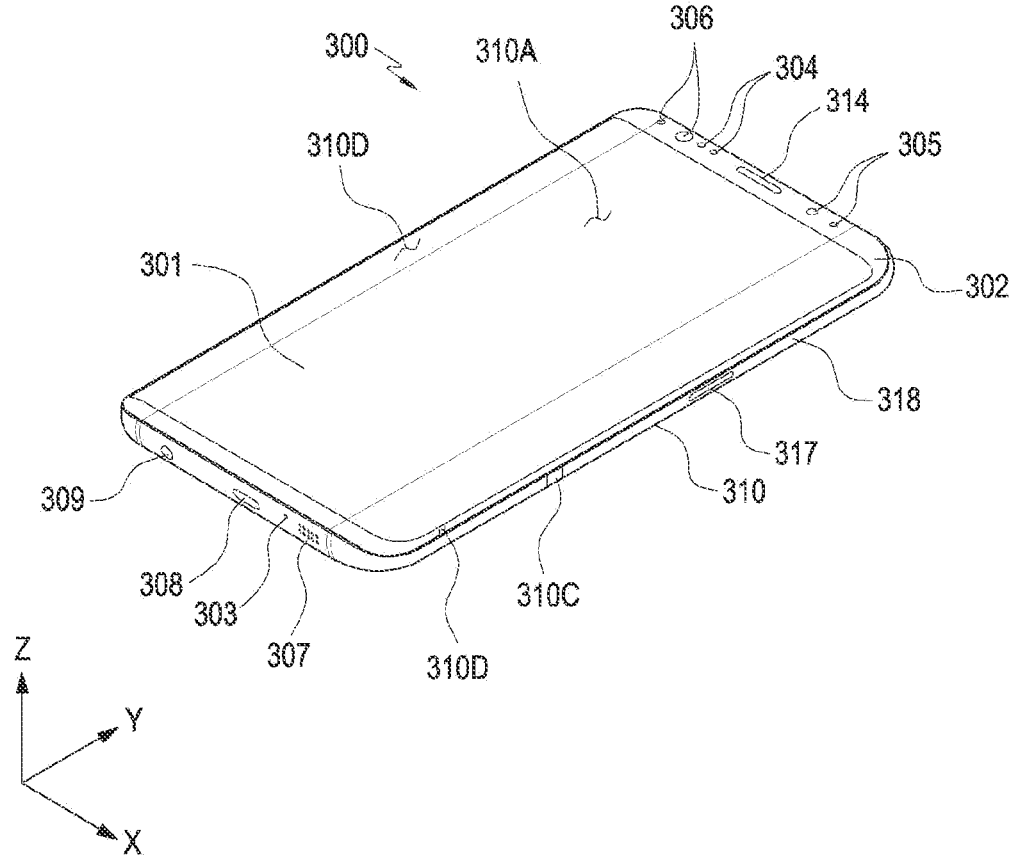
FIG. 3 is a perspective view illustrating the front side of an electronic device according to an embodiment.
Figure 4:
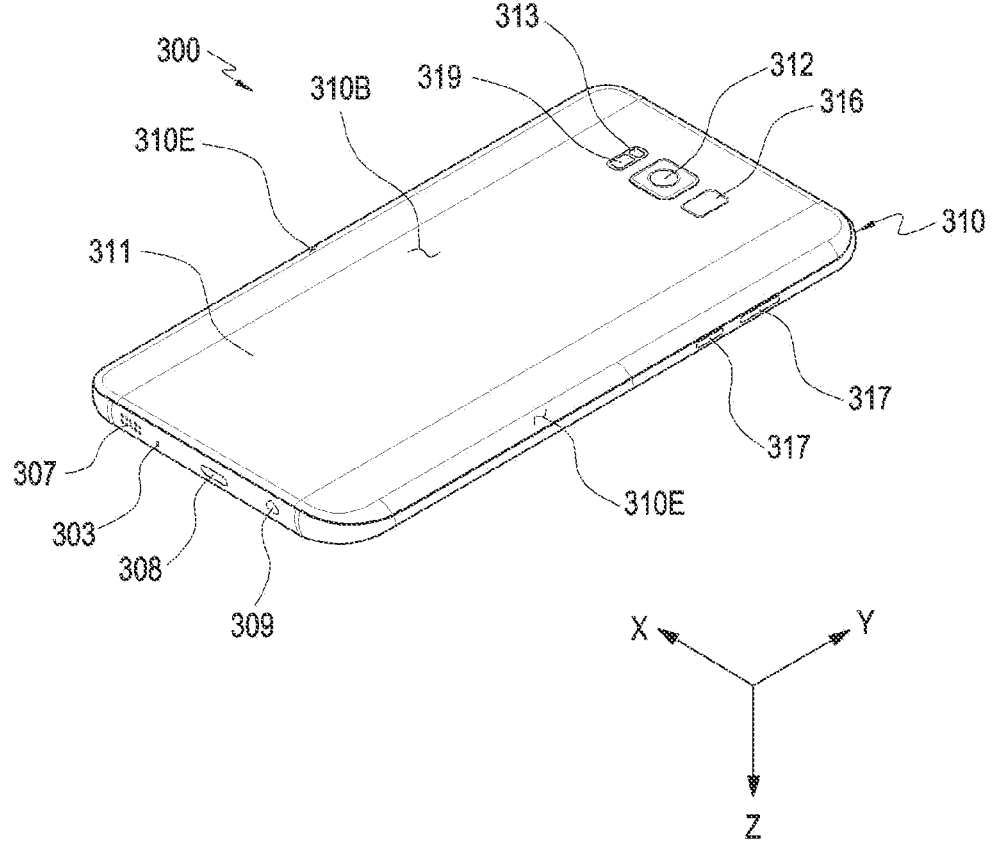
FIG. 4 is a perspective view illustrating the rear side of the electronic device illustrated in FIG. 3.

FIG. 3 is a perspective view illustrating the front side of an electronic device 300 (e.g., the electronic device 101 in FIG. 1) according to an embodiment. FIG. 4 is a perspective view illustrating the rear side of the electronic device 300 illustrated in FIG. 3.

Referring to FIGS. 3 and 4, the electronic device 300 (e.g., the electronic device 101 in FIG. 1) according to an embodiment may include a housing 310 including a first surface (or front surface) 310A, a second surface (or rear surface) 310B, and a side surface 310C surrounding the space between the first surface 310A and the second surface 310B. In another embodiment (not illustrated), the housing 310 may refer to a structure that defines some of the first surface 310A, the second surface 310B, and the side surface 310C of FIG. 3. According to an embodiment, at least a portion of the first surface 310A may be implemented by a substantially transparent front plate 302 (e.g., glass plate or polymer plate including various coating layers). In another embodiment, the front plate 302 may be coupled to the housing 310 to define an inner space of the housing 310. In one or more embodiments, the term "inner space" may mean the inner space of the housing 310 that accommodates at least a portion of a display 301, which will be described later, or the display device 160 in FIG. 1.

According to an embodiment, the second surface 310B may be implemented by a substantially opaque rear plate 311. The rear plate 311 may be made of, for example, coated or colored glass, ceramic, polymer, metal (e.g., aluminum, stainless steel (STS), or magnesium), or a combination of two or more of these materials. The side surface 310C may be implemented by a side bezel structure (or "side member") 318 coupled to the front plate 302 and the rear plate 311 and including metal and/or polymer. In another embodiment, the rear plate 311 and the side bezel structure 318 may be integrated together, and may include the same material (e.g., metal material such as aluminum).

In the illustrated embodiment, the front plate 302 may include, at the long opposite edges thereof, two first areas 310D, which are bent from the first surface 310A toward the rear plate 311 and extend seamlessly. In the illustrated embodiment (see FIG. 4), the rear plate 311 may include, at the long opposite edges thereof, two second areas 310E, which are bent from the second surface 310B toward the front plate 302 and extend seamlessly. In other embodiments, the front plate 302 (or the rear plate 311) may include only one of the first areas 310D (or the second areas 310E). In another embodiment, some of the first areas 310D or the second areas 310E may not be included. In the above-described embodiments, when viewed from a side of the electronic device 300, the side bezel structure 318 may have a first thickness (or width) on the side surface in which the first areas 310D or the second areas 310E are not included (e.g., the side surface in which the connector hole 308 is disposed), and may have a second thickness, which is smaller than the first thickness, on the side surface in which the first areas 310D or the second areas 310E are included (e.g., the side surfaces in which the key input devices 317 are disposed).

According to an embodiment, the electronic device 300 may include at least one of a display 301, audio modules 303, 307, and 314, sensor modules 304, 316, and 319, camera modules 305, 312, and 313 (e.g., the camera modules 180 and 280 in FIG. 1 or 2), key input devices 317, light-emitting elements 306, and connector holes 308 and 309. In certain other embodiments, at least one of the components (e.g., the key input devices 317 or the light-emitting elements 306) may be omitted from the electronic device 300, or the electronic device 300 may additionally include other components.

The display 301 (e.g., the display device 160 in FIG. 1) may be exposed through a substantial portion of, for example, the front plate 302. In an embodiment, at least a portion of the display 301 may be exposed through the front plate 302 defining the first surface 310A and the first areas 310D of the side surfaces 310C. In an embodiment, the edges of the display 301 may be formed to be substantially the same as the shape of the periphery of the front plate 302 adjacent thereto. In another embodiment (not illustrated), the distance between the periphery of the display 301 and the periphery of the front plate 302 may be substantially constant in order to maximize the exposed area of the display 301.

In another embodiment (not illustrated), recesses or openings may be provided in a portion of a screen display area (e.g., active area) of the display 301 or an area outside the screen display area (e.g., inactive area), and at least one of audio modules 314 (e.g., the audio module 170 in FIG. 1), sensor modules 304 (e.g., the sensor module 176 in FIG. 1), camera modules 305, and light-emitting elements 306 may be aligned with or disposed within the recesses or the openings. In another embodiment (not illustrated), the rear surface of the screen display area of the display 301 may include at least one of audio modules 314, sensor modules 304, camera modules 305, a fingerprint sensor 316, and light-emitting elements 306. In another embodiment (not illustrated), the display 301 may be coupled to or disposed adjacent to a touch-sensitive circuit, a pressure sensor capable of measuring touch intensity (pressure), and/or a digitizer configured to detect a magnetic field-type stylus pen. In some embodiments, at least some of the sensor modules 304 and 319 and/or at least some of the key input devices 317 may be disposed in the first areas 310D and/or the second areas 310E.

The audio modules 303, 307, and 314 may include a microphone hole 303 and speaker holes 307 and 314. In the microphone hole 303, a microphone for acquiring external sound may be disposed therein, and a plurality of microphones may be disposed to sense the direction of the sound in an embodiment. The speaker holes 307 and 314 may include an external speaker hole 307 and a call receiver hole 314. In some embodiments, the speaker holes 307 and 314 and the microphone hole 303 may be implemented as a single hole, or a speaker (e.g., piezo speaker) may be included without the speaker holes 307 and 314.

The sensor modules 304, 316, and 319 may generate electrical signals or data values corresponding to internal operating state(s) of the electronic device 300 or external environmental state(s). The sensor modules 304, 316, and 319 may include, for example, a first sensor module 304 (e.g., proximity sensor), a second sensor module (not illustrated) (e.g., fingerprint sensor) disposed on the first surface 310A of the housing 310, a third sensor module 319 (e.g., heart-rate monitor (HRM) sensor), and/or a fourth sensor module 316 (e.g., fingerprint sensor) disposed on the second surface 310B of the housing 310. The fingerprint sensor may be disposed not only on the first surface 310A (e.g., the display 301) of the housing 310, but also on the second surface 310B. The electronic device 300 may further include at least one other sensor module (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312, and 313 may include a first camera device 305 disposed on the first surface 310A of the electronic device 300, and a second camera device 312 and/or a flash 313 disposed on the second surface 310B. The camera modules 305 and 312 may each include one or more lenses, an image sensor, and/or an image signal processor. The flash 313 may include, for example, a light-emitting diode or a xenon lamp. In an embodiment, two or more lenses (e.g., an infrared camera lens, a wide-angle lens, and a telephoto lens) and image sensors may be disposed on one surface of the electronic device 300.

The key input devices 317 may be disposed on the side surface 310C of the housing 310. In another embodiment, the electronic device 300 may not include some or all of the above-mentioned key input devices 317, and the key input device 317 that is not included therein may be implemented in another form, for example as a soft key, on the display 301. In some embodiments, the key input devices may include a sensor module 316 disposed on the second surface 310B of the housing 310.

The light-emitting elements 306 may be disposed, for example, on the first surface 310A of the housing 310. The light-emitting elements 306 may optically provide, for example, information about the state of the electronic device 300. In another embodiment, the light-emitting elements 306 may provide a light source that works with the camera modules 305, for example, as a flash for the camera modules 305. The light-emitting elements 306 may include, for example, an LED, an IR LED, and a xenon lamp.

The connector holes 308 and 309 may include a first connector hole 308, which is capable of accommodating a connector (e.g., USB connector) for transmitting/receiving power and/or data to/from an external electronic device, and/or a second connector hole 309, which is capable of accommodating a connector (e.g., earphone jack) for transmitting/receiving an audio signal to/from an external electronic device.

Figure 5:
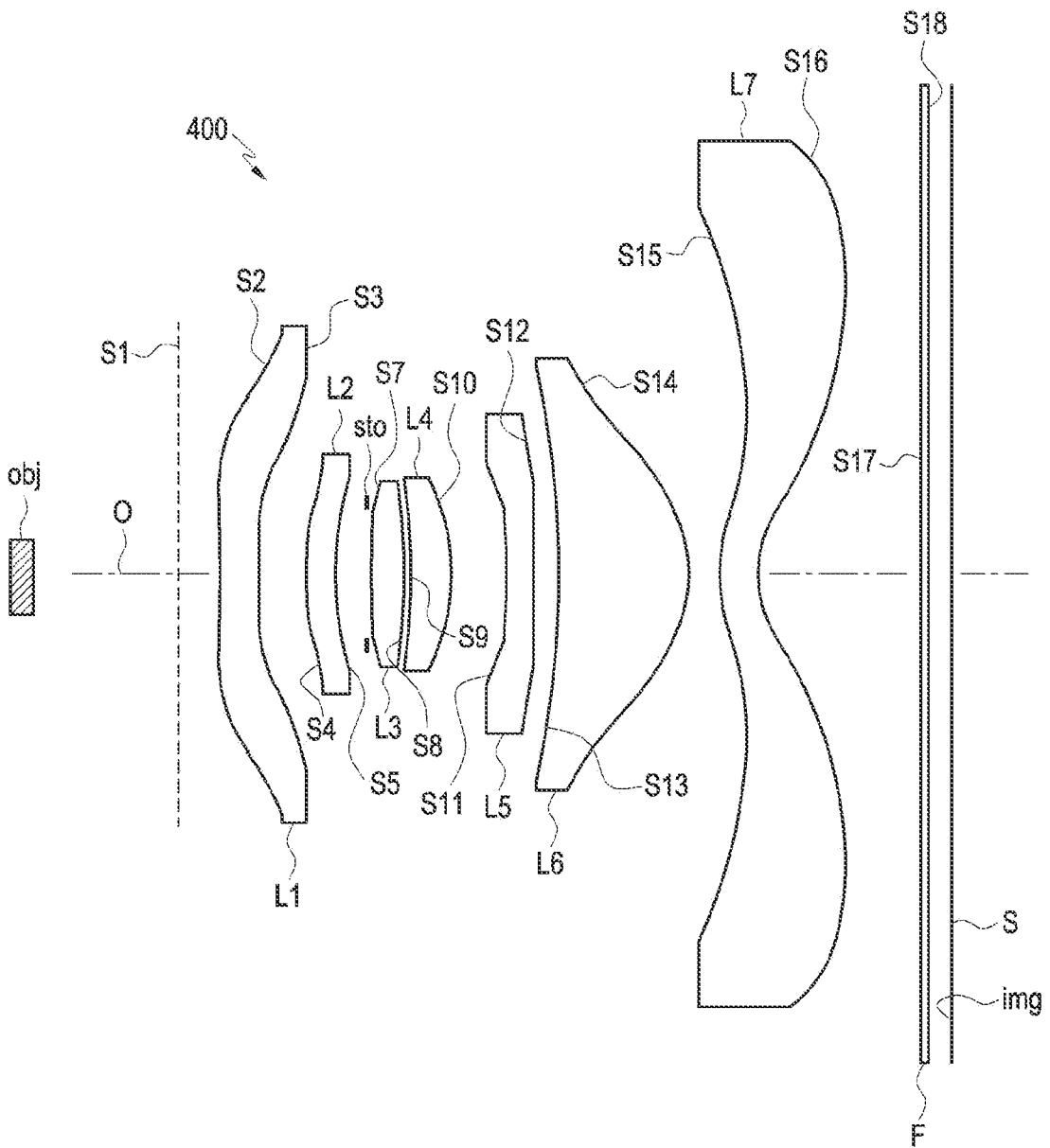
FIG. 5 is a view illustrating the configuration of a lens assembly according to one of the embodiments of the disclosure.
Figures 6A, 6B, 6C:
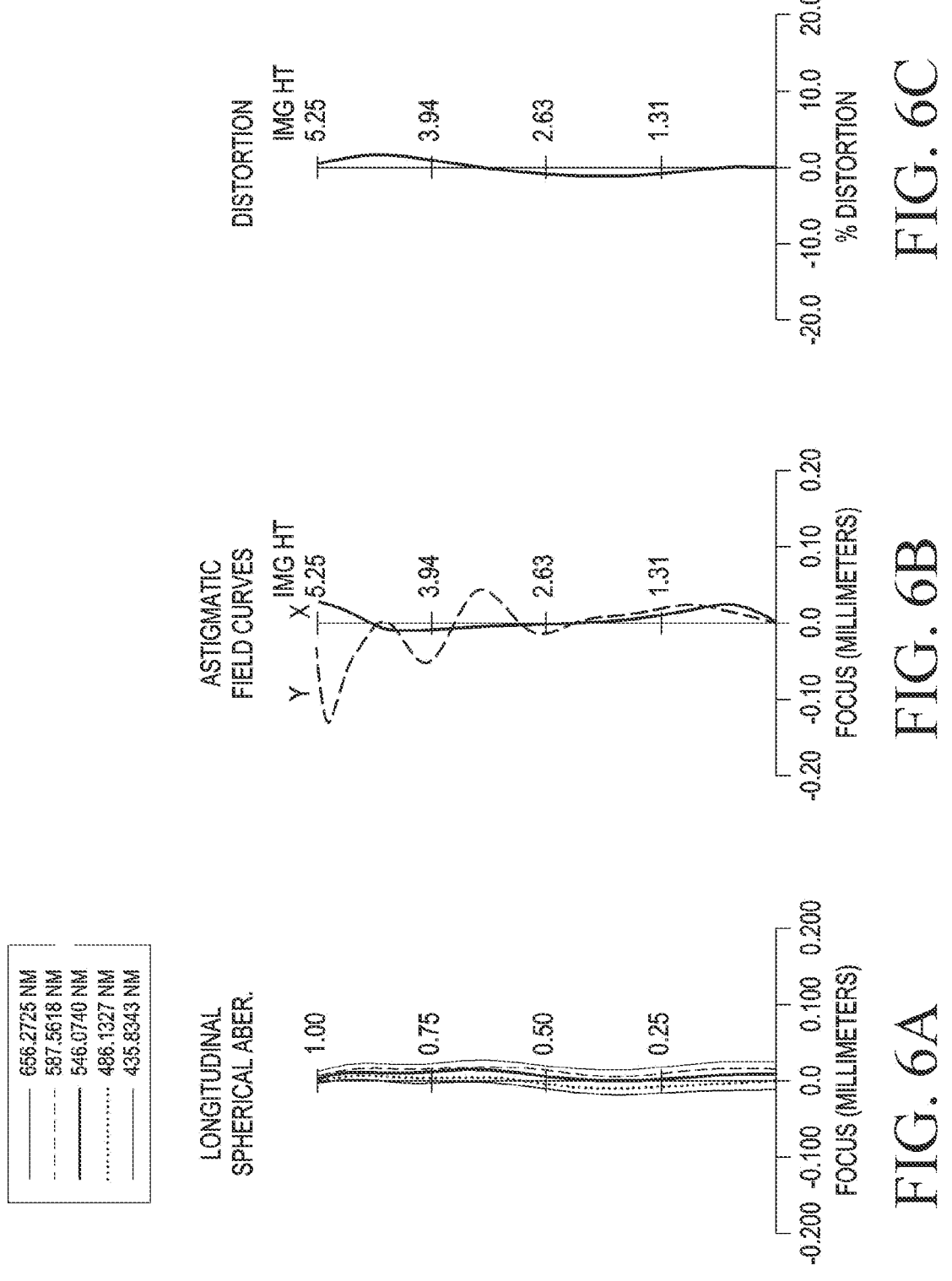
FIGS. 6A, 6B, and 6C are graphs illustrating spherical aberration, astigmatism, and distortion rate of a lens assembly according to one of the embodiments of the present disclosure.

FIG. 5 is a view illustrating the configuration of a lens assembly 400 according to one of various embodiments of the disclosure. FIGS. 6A, 6B, and 6C are graphs illustrating spherical aberration, astigmatism, and distortion rate of the lens assembly 400 according to one of the embodiments of the present disclosure.

FIG. 6A is a graph illustrating the spherical aberration of the lens assembly 400 according to one of the embodiments of the disclosure, in which the horizontal axis represents the longitudinal spherical aberration coefficient and the vertical axis represents the normalized distance from the center of an optical axis. FIG. 6A illustrates a change in longitudinal spherical aberration depending on wavelength of light. FIG. 6B is a graph illustrating the astigmatism of the lens assembly 400 according to one of the embodiments of the disclosure, and FIG. 6C is a graph illustrating the distortion rate of the lens assembly 400 according to one of the embodiments of the disclosure.

Referring to FIGS. 5, 6A, 6B, and 6C, the lens assembly 400 (e.g., the lens assembly 210 and/or the image sensor 230 in FIG. 2) according to one of the embodiments of the disclosure may include a plurality of (e.g., at least seven) lenses L1, L2, L3, L4, L5, L6, and L7, an infrared-ray (IR) cut filter F, and/or an image sensor S (e.g., the image sensor 230 in FIG. 2 implementing the imaging plane img). According to an embodiment, the IR cut filter F and/or the image sensor S or 230 may be described as components separate from the lens assembly 400. For example, the IR cut filter F and/or the image sensor S or 230 may be mounted in an electronic device (e.g., the electronic device 101, 102, 104, or 300 in FIG. 1 or FIG. 3) or an optical device (e.g., the camera module 180 or 280 in FIG. 1 or FIG. 2), and a plurality of lenses L1, L2, L3, L4, L5, L6, and L7 constituting the lens assembly 400 may be mounted in the electronic device or the optical device to be aligned with the IR cut filter F and/or the image sensor S or 230 on the optical axis O. In an embodiment, at least one of the lenses L1, L2, L3, L4, L5, L6, and L7 may be movable along the optical axis O direction, and the electronic device (e.g., the electronic device 101, 102, 104, or 300 in FIG. 1 or FIG. 3) or the processor 120 of FIG. 1 may perform focus adjustment or focal length adjustment by moving at least one of the lenses L1, L2, L3, L4, L5, L6, and L7. In an embodiment, the lens assembly 400 may be disposed as one of the camera modules 305, 312, and 313 in FIG. 3 or FIG. 4.

According to an embodiment, the plurality of lenses L1, L2, L3, L4, L5, L6, and L7 may be made of plastic material or glass material, and may include a first lens L1, a second lens L2, a third lens L3, a fourth lens L4, a fifth lens L5, a sixth lens L6, and/or a seventh lens L7 sequentially arranged along the optical axis O direction from an object obj side to the image sensor S or 230 (e.g., the imaging surface img) side. For example, the lenses L1, L2, L3, L4, L5, L6, and L7 may be aligned on the optical axis O together with the image sensor S or 230. The lenses L1, L2, L3, L4, L5, L6, and L7 may each include an object obj side surface and an image sensor S or 230 side surface. In the various embodiments below, it should be noted that, for the sake of clarity of the drawings, reference numerals are omitted for some of the object side surfaces and image sensor side surfaces of the lenses L1, L2, L3, L4, L5, L6, and L7. In the following detailed description, reference numerals in the form of "Sd" in which "d" is a natural number may be assigned to object side surfaces or image sensor side surfaces of lenses, and lens surfaces whose reference numerals are omitted from the drawings may be easily understood through the tables to be described below with respect to lens data of various embodiments.

In the detailed description below, the object side surfaces or the image sensor side surfaces of the lenses L1, L2, L3, L4, L5, L6, and L7 may be described by using the terms "concave" and "convex." The description for the shapes of lens surfaces may depend on the shapes of the lenses at points intersecting the optical axis O. For example, if the description states that "an object side surface is concave," this may refer to an object side surface whose center of the radius of curvature is located on the object side rather than on the image side. Similarly, if the description states that "an object side surface is convex," this may refer to an object side surface whose center of the radius of curvature is located on the image side rather than on the object side. If the description states that "an image sensor side surface is concave," this may refer to an image sensor side surface whose center of the radius of curvature is located on the image side rather than on the object side. Finally, if the description states that "an image sensor side surface is convex," this may refer to an image sensor side surface whose center of the radius of curvature surface is located on the object side rather than on the image sensor side. For example, in FIG. 5, the object side surface S15 of the seventh lens L7 may be understood to be convex, and the image sensor side surface S16 may be understood to be concave.

According to an embodiment, the first lens L1 may include a concave object side surface S2 and a convex image sensor side surface S3 while having negative refractive power. By making the object side surface S2 of the first lens (e.g., the first lens L1) disposed first from the object side with these characteristics, the lens assembly 400 may be miniaturized while having ultra-wide angle characteristic of about 50 degrees or more. In some embodiments, when the second lens and/or third lenses from the object side have positive refractive power, it may be easier to implement the ultra-wide-angle characteristic of the lens assembly or to miniaturize the lens assembly.

According to an embodiment, when combined with a high-performance image sensor having the size of about 1/1.2 inch or larger, the lens assembly 400 may include seven lenses L1, L2, L3, L4, L5, L6, and L7 and one of the second lens L2 and the third lens L3 (e.g., the second lens L2) may have refractive index of about 1.6 or more. In an embodiment, when at least one of the second lens L2 and the third lens L3 has refractive index of about 1.6 or more, the lens assembly 400 may be easily improved in aberration control (e.g., control of spherical aberration) or may exhibit improvement in distortion rate even while including seven lenses L1, L2, L3, L4, L5, L6, and L7 so that the lens assembly 400 can be combined with the high-performance image sensor (e.g., the image sensor S). For example, the lens assembly 400 may provide optical performance suitable for the enlarged high-performance image sensor S, and may be easily disposed in a miniaturized electronic device such as a smartphone (e.g., the electronic device 101, 102, 104, or 300 in FIGS. 1 to 4). In another embodiment, the higher the refractive index of the lens (e.g., the second lens L2 and/or the third lens L3), the easier it is to control the spherical aberration, but the refractive index may be limited by the material of the lens. Thus, the second lens L2 and/or the third lens L3 may have refractive index of about 1.7 or less. For example, when the refractive index exceeds about 1.7, the material of the lens is limited to glass, so there may be difficulty in manufacturing the lens assembly. In addition, the cost of manufacturing the lens assembly may increase. In some embodiments, the second lens L2 may have refractive index of about 1.6 or more, and the third lens L3 may have refractive index of about 1.6 or less.

According to an embodiment, the seventh lens from the object side among the lenses L1, L2, L3, L4, L5, L6, and L7, for example, the seventh lens L7 may have refractive index of about 1.6 or more while having negative refractive power. When the seventh lens L7 has refractive index of about 1.6 or more, the lens assembly 400 is capable of suppressing deterioration of peripheral image quality such as field curvature even while being combined with the enlarged image sensor S. In some embodiments, since the seventh lens L7 has refractive index of about 1.7 or less, freedom of design in selecting the material of the lenses may be improved.

According to an embodiment, at least one of object side surfaces or image sensor side surfaces of the lenses L1, L2, L3, L4, L5, L6, and L7 may be aspherical or include an inflection point. For example, at least one of the object side surface S4 and the image sensor side surface S5 of the second lens L2 may be an aspherical surface, and at least one of the object side surface S15 of the seventh lens L7 and the image sensor side surface S16 may include an inflection point.

According to an embodiment, the IR cut filter F may be disposed between the seventh lens L7 and the image sensor S (e.g., the imaging surface img), and may block light of a predetermined wavelength band, for example, infrared rays. For example, the IR cut filter F may block infrared rays while transmitting visible light, thereby suppressing or preventing incidence of infrared rays at the image sensor S, for example, the imaging surface img. The wavelength band of light blocked by the IR cut filter F may be variously selected depending on specifications required in terms of the lens assembly 400 or an electronic device (e.g., the electronic devices 101, 102, 104, or 300 in FIGS. 1 to 4) including the lens assembly 400. For example, when the lens assembly 400 in FIG. 5 is applied to an optical device for detecting infrared rays, it is possible to transmit infrared rays and to block light of another wavelength band (e.g., visible light) by replacing the IR cut filter F with a band pass filter.

According to an embodiment, the lens assembly 400 may be any one of the camera modules 180, 280, 305, 312, and 313 of FIGS. 1 to 4, and the processor 120 of FIG. 1 or the image signal processor 260 of FIG. 2 may receive or detect light incident from the outside by using the lens assembly 400 and acquire image information based on the detected light. For example, the processor 120 or the image signal processor 260 may acquire an object image by using the camera or the lens assembly 400.

Lens data of the lens assembly 400 according to certain embodiments is shown in Tables 1 to 20, in which "obj" may refer an object whose image is to be captured. As described above, reference numerals indicated in the form of "Sd" in which "d" is a natural number "d" indicate object side surfaces and image sensor side surfaces of the related lenses L1, L2, L3, L4, L5, L6, and L7, and the symbol "*" may be indicated on the corresponding lens surface has aspherical shape. In the lens data, "S1" is not an actual lens surface, but a position considered in the design of the lens assembly 400, and may refer to, for example, a reference position of a structure such as a protection window or a position of a structure for fixing one of the lenses L1, L2, L3, L4, L5, L6, and L7 (e.g., the first lens L1). In the lens data, "sto" may refer to a diaphragm of the lens assembly 400, and "S17" and "S18" may refer to the subject side surface and the image sensor side surface of the IR cut filter.

Example 1

In the lens assembly 400 of FIG. 5, the diaphragm sto may be disposed between the second lens L2 and the third lens L3, and may have a focal length of about 3.2 mm, a half field of view (HFOV)) of about 58 degrees, and a F-number of about 2.5. The lens assembly 400 and/or the lenses L1, L2, L3, L4, L5, L6, and L7 may be manufactured with the specifications shown in Table 1 below while satisfying the above-mentioned conditions with respect to the refractive powers, lens surface shapes, refractive indices, and/or the like.

TABLE 1

| Lens surfaces | Curvature radius | Thickness or air gap | Effective focal length (EFL) | Refractive index (nd) | Abbe number (vd) |
|---|---|---|---|---|---|
| obj | infinity | infinity | | | |
| S1 | infinity | 0.03000 | | | |
| S2* | −4.82559 | 0.41587 | −12.700 | 1.54405 | 56.11 |
| S3* | −16.32687 | 0.48396 | | | |
| S4* | 3.19690 | 0.30743 | 21.704 | 1.61444 | 25.94 |
| S5* | 4.03870 | 0.33521 | | | |
| sto | infinity | 0.05003 | | | |
| S7* | 15.83772 | 0.35369 | 7.535 | 1.54405 | 56.11 |
| S8* | −5.51939 | 0.05091 | | | |
| S9* | −5.70916 | 0.44226 | 12.450 | 1.54405 | 56.11 |
| S10* | −3.18897 | 0.45622 | | | |
| S11* | 389.55546 | 0.26851 | −9.134 | 1.66121 | 20.35 |
| S12* | 6.01223 | 0.32562 | | | |
| S13* | −19.51571 | 1.37521 | 2.283 | 1.54405 | 56.11 |

TABLE 1-continued

| Lens surfaces | Curvature radius | Thickness or air gap | Effective focal length (EFL) | Refractive index (nd) | Abbe number (vd) |
|---|---|---|---|---|---|
| S14* | −1.20160 | 0.38151 | | | |
| S15* | 1.42132 | 0.37902 | −3.02128 | 1.63971 | 23.53 |
| S16* | 0.73639 | 1.50309 | | | |
| S17 | infinity | 0.11 | infinity | 1.5168 | 64.2 |
| S18 | infinity | 0.03803 | | | |
| img | infinity | −0.00658 | | | |

The following Table 2, Table 3, and Table 4 indicate the aspherical coefficients of the first to seventh lenses L1 to L7, and the definitions of aspherical surfaces may be calculated through Equation 1 below.

$$z = \frac{c'y^2}{1 + \sqrt{1 - (k+1)c'^2 y^2}} + Ay^4 +$$

$$By^6 + Cy^8 + Dy^{10} + Ey^{12} + Fy^{14} + Gy^{16} + Hy^{18} +$$

$$Jy^{20} + Ky^{22} + Ly^{24} + My^{26} + Ny^{28} + Oy^{30}$$

[Equation 1]

Here, "z" may mean the distance from a lens vertex in the direction of the optical axis O, "y" may mean the distance in the direction perpendicular to the optical axis O, "c" may mean the inverse of the curvature radius at the vertex of the lens, "k" may mean a Conic constant, and "A", "B", "C", "D", "E", "F", "G", "H", "J", "K", "L", "M", "N", and "O" may mean aspherical coefficients, respectively.

TABLE 2

| Lens surfaces | S2 | S3 | S4 | S5 | S7 |
|---|---|---|---|---|---|
| Curvature radius | −4.82559E+00 | −1.63269E+01 | 3.19690E+00 | 4.03870E+00 | 1.58377E+01 |
| k | −9.94754E+01 | −8.47577E+02 | −1.00594E+00 | 1.03802E+01 | 7.34778E+01 |
| A | 3.86050E−02 | 1.52193E−01 | 1.36178E−02 | 4.20275E−03 | 2.04713E−02 |
| B | 6.7857E−02 | −6.97877E−02 | 1.99016E−01 | −9.42489E−02 | −5.44098E−01 |
| C | −1.41179E−01 | 2.33163E−02 | −2.47292E+00 | 1.34816E−01 | 6.19482E+00 |
| D | 1.62035E−01 | 6.22658E−03 | 1.38962E+01 | 3.56116E+00 | −4.32501E+01 |
| E | −1.27314E−01 | −2.45287E−02 | −4.94278E+01 | −4.73118E+01 | 1.86727E+02 |
| F | 7.17286E−02 | 3.40258E−02 | 1.18656E+02 | 2.94934E+02 | −4.58953E+02 |
| G | −2.94546E−02 | −3.18292E−02 | −1.98784E+02 | −1.11700E+03 | 3.27430E+02 |
| H | 8.85815E−03 | 1.96321E−02 | 2.36384E+02 | 2.78682E+03 | 1.78594E+03 |
| J | −1.94355E−03 | −7.97930E−03 | −2.00338E+02 | −4.73676E+03 | −7.20561E+03 |
| K | 3.06768E−04 | 2.15552E−03 | 1.19923E+02 | 5.52764E+03 | 1.38143E+04 |
| L | −3.38422E−05 | −3.84257E−04 | −4.94050E+01 | −4.36260E+03 | −1.61434E+04 |
| M | 2.47152E−06 | 4.35243E−05 | 1.32814E+01 | 2.22581E+03 | 1.17194E+04 |
| N | −1.07153E−07 | −2.84184E−06 | −2.08763E+00 | −6.62478E+02 | −4.88587E+03 |
| O | 2.08432E−09 | 8.14857E−08 | 1.44577E−01 | 8.73133E+01 | 8.97811E+02 |

TABLE 3

| Lens surfaces | S8 | S9 | S10 | S11 | S12 |
|---|---|---|---|---|---|
| Curvature radius | −5.51939E+00 | −5.70916E+00 | −3.18897E+00 | 3.89555E+02 | 6.01223E+00 |
| k | −3.61219E−01 | 4.47688E+00 | 3.41658E−01 | −1.00000E+00 | −4.25847E+00 |
| A | 2.91063E−02 | 4.69632E−02 | −5.47044E−02 | −1.76127E−01 | −1.68331E−01 |
| B | −1.00680E+00 | −8.88685E−01 | −4.49653E−02 | 1.51948E−01 | 2.77314E−01 |
| C | 1.46769E+01 | 1.04923E+01 | 1.42455E+00 | −2.12896E−01 | −7.09287E−01 |
| D | −1.32543E+02 | −8.35655E+01 | −1.33648E+01 | −5.87220E−01 | 1.53544E+00 |
| E | 7.96003E+02 | 4.53963E+02 | 7.05430E+01 | 4.83913E+00 | −2.48625E+00 |
| F | −3.32336E+03 | −1.72282E+03 | −2.44148E+02 | −1.51614E+01 | 2.94887E+00 |

TABLE 3-continued

| Lens surfaces | S8 | S9 | S10 | S11 | S12 |
|---|---|---|---|---|---|
| G | 9.89518E+03 | 4.64909E+03 | 5.86713E+02 | 2.88168E+01 | −2.55501E+00 |
| H | −2.12548E+04 | −8.99960E+03 | −1.00372E+03 | −3.66008E+01 | 1.61928E+00 |
| J | 3.29559E+04 | 1.24964E+04 | 1.23125E+03 | 3.21231E+01 | −7.48167E−01 |
| K | −3.64910E+04 | −1.23156E+04 | −1.07493E+03 | −1.95861E+01 | 2.48795E−01 |
| L | 2.81099E+04 | 8.39539E+03 | 6.51600E+02 | 8.15222E+00 | −5.79229E−02 |
| M | −1.43002E+04 | −3.75905E+03 | −2.60461E+02 | −2.20967E+00 | 8.95254E−03 |
| N | 4.31626E+03 | 9.93441E+02 | 6.16808E+01 | 3.51454E−01 | −8.24698E−04 |
| O | −5.85036E+02 | −1.17299E+02 | −6.54889E+00 | −2.48760E−02 | 3.42572E−05 |

TABLE 4

| Lens surfaces | S13 | S14 | S15 | S16 |
|---|---|---|---|---|
| Curvature radius | −1.95157E+01 | −1.20160E+00 | 1.42132E+00 | 7.36386E−01 |
| k | 6.42023E+01 | −1.52243E+00 | −1.26201E+01 | −3.64886E+00 |
| A | −2.35258E−02 | 2.17318E−02 | 3.21820E−02 | 6.19319E−03 |
| B | 5.08486E−02 | 1.01610E−01 | −4.25236E−02 | −2.27368E−02 |
| C | −6.03459E−02 | −2.87645E−01 | 1.91304E−02 | 1.24529E−02 |
| D | 3.03249E−02 | 4.01952E−01 | −5.37186E−03 | −4.14865E−03 |
| E | 1.41432E−02 | −3.68847E−01 | 1.02705E−03 | 9.65977E−04 |
| F | −3.70248E−02 | 2.38556E−01 | −1.32306E−04 | −1.63455E−04 |
| G | 3.20868E−02 | −1.11573E−01 | 1.04550E−05 | 2.03335E−05 |
| H | −1.69254E−02 | 3.80726E−02 | −2.92558E−07 | −1.86020E−06 |
| J | 6.00666E−03 | −9.45482E−03 | −3.58426E−08 | 1.24268E−07 |
| K | −1.46912E−03 | 1.68567E−03 | 5.12606E−09 | −5.96690E−09 |
| L | 2.45144E−04 | −2.09762E−04 | −3.20177E−10 | 1.99974E−10 |
| M | −2.67166E−05 | 1.72762E−05 | 1.14036E−11 | −4.43156E−12 |
| N | 1.71656E−06 | −8.45903E−07 | −2.24358E−13 | 5.82720E−14 |
| O | −4.93481E−08 | 1.86448E−08 | 1.90082E−15 | −3.43907E−16 |

Example 2

Figure 7:
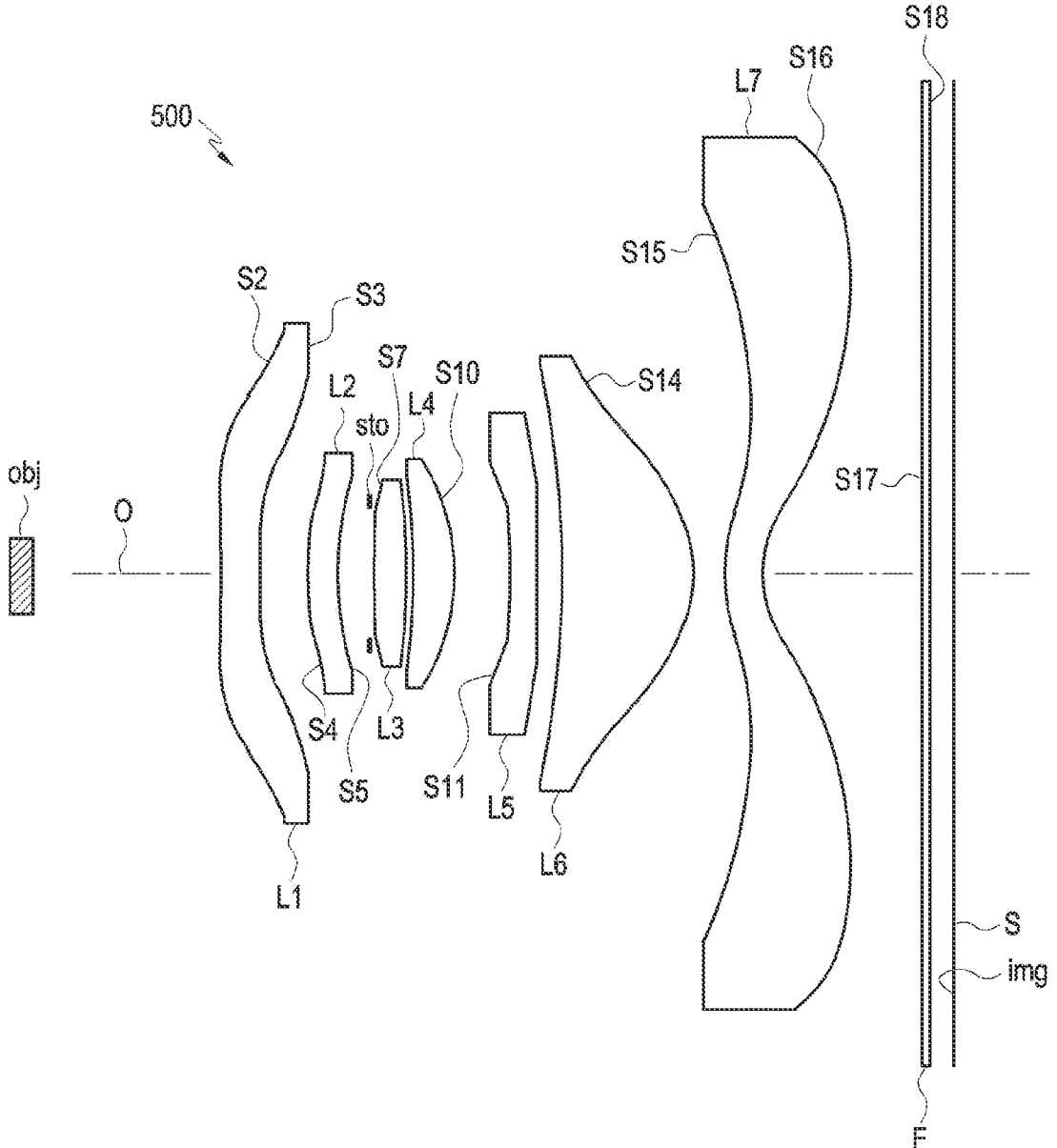
FIG. 7 is a view illustrating the configuration of a lens assembly according to another one of the embodiments of the disclosure.
Figures 8A, 8B, 8C:
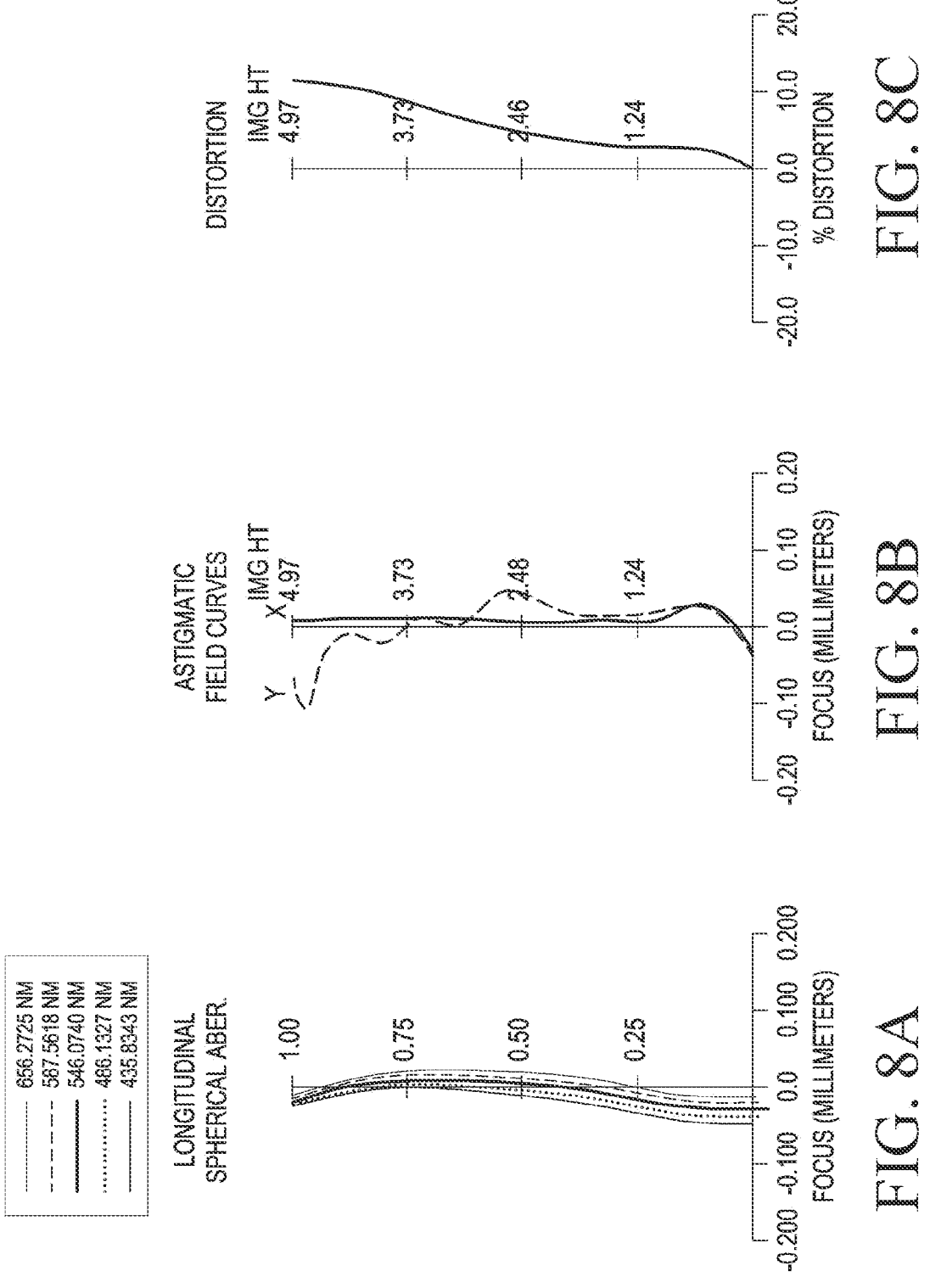
FIGS. 8A, 8B, and 8C are graphs illustrating spherical aberration, astigmatism, and distortion rate of a lens assembly according to another one of the embodiments of the present disclosure.

FIG. 7 is a view illustrating the configuration of a lens assembly 500 (e.g., the lens assembly 400 in FIG. 5) according to another one of the embodiments of the disclosure. FIGS. 8A, 8B, and 8C are graphs illustrating spherical aberration, astigmatism, and distortion rate of the lens assembly 500 according to another one of the embodiments of the disclosure.

In the lens assembly 500 of FIG. 7, the focal length may be about 3.0 mm, the half field of view may be about 56 degrees, and the F-number may be about 2.3. The lens assembly 500 and/or the lenses L1, L2, L3, L4, L5, L6, and L7 may be manufactured with the specifications shown in Table 5 below while satisfying the above-mentioned conditions with respect to the refractive powers, lens surface shapes, refractive indices, and/or the like, and may have aspherical coefficients of Tables 6 to 8.

TABLE 5

| Lens surfaces | Radius of curvature | Thickness or air gap | Effective focal length | Refractive index | Abbe number |
|---|---|---|---|---|---|
| Obj | infinity | infinity | | | |
| S1 | infinity | 0.03002 | | | |
| S2* | −4.97836 | 0.41886 | −13.052 | 1.54405 | 56.11 |
| S3* | −16.98258 | 0.48987 | | | |
| S4* | 3.24177 | 0.30389 | 26.123 | 1.61444 | 25.94 |
| S5* | 3.90753 | 0.34273 | | | |
| Sto | infinity | 0.04775 | | | |
| S7* | 13.69960 | 0.33597 | 7.260 | 1.54405 | 56.11 |
| S8* | −5.53466 | 0.04532 | | | |
| S9* | −5.70916 | 0.44226 | 12.450 | 1.54405 | 56.11 |
| S10* | −3.18897 | 0.45622 | | | |
| S11* | −1228.22281 | 0.28113 | −9.183 | 1.66121 | 20.35 |
| S12* | 6.17200 | 0.39179 | | | |
| S13* | −18.72077 | 1.36687 | 2.237 | 1.54405 | 56.11 |
| S14* | −1.17680 | 0.23744 | | | |
| S15* | 1.26115 | 0.40000 | −3.35704 | 1.63971 | 23.53 |
| S16* | 0.69819 | 1.49054 | | | |
| S17 | infinity | 0.11 | infinity | 1.5168 | 64.2 |
| S18 | infinity | 0.04147 | | | |
| Img | infinity | 0.03118 | | | |

TABLE 6

| Lens surfaces | S2 | S3 | S4 | S5 | S7 |
|---|---|---|---|---|---|
| Curvature radius | −4.97836E+00 | −1.69826E+01 | 3.24177E+00 | 3.90753E+00 | 1.36996E+01 |
| k | −1.18901E+02 | −8.46976E+02 | −8.91963E−01 | 1.03703E+01 | 7.98308E+01 |
| A | 4.22457E−02 | 1.46558E−01 | 2.43853E−02 | 2.01666E−02 | 4.52305E−02 |
| B | 6.00399E−02 | −2.09164E−02 | 1.64633E−02 | −3.94909E−01 | −1.49493E+00 |
| C | −1.24386E−01 | −1.54210E−01 | −8.27304E−02 | 3.64027E+00 | 2.43738E+01 |
| D | 1.37448E−01 | 3.73232E−01 | 4.74930E+00 | −2.70258E+01 | −2.48868E+02 |
| E | −1.03422E−01 | −5.12753E−01 | −1.66553E+01 | 1.47674E+02 | 1.69486E+03 |
| F | 5.59922E−02 | 4.76747E−01 | 3.99895E+01 | −5.84405E+02 | −8.02568E+03 |
| G | −2.22504E−02 | −3.15364E−01 | −6.86003E+01 | 1.67642E+03 | 2.71122E+04 |
| H | 6.52425E−03 | 1.50526E−01 | 8.54678E+01 | −3.50046E+03 | −6.61877E+04 |
| J | −1.40458E−03 | −5.18263E−02 | −7.74543E+01 | 5.31539E+03 | 1.16964E+05 |
| K | 2.18540E−04 | 1.27324E−02 | 5.05098E+01 | −5.80506E+03 | −1.48101E+05 |
| L | −2.38338E−05 | −2.17600E−03 | −2.30837E+01 | 4.44055E+03 | 1.30926E+05 |
| M | 1.72294E−06 | 2.45846E−04 | 7.01509E+00 | −2.25719E+03 | −7.67141E+04 |
| N | −7.39356E−08 | −1.65143E−05 | −1.27297E+00 | 6.84473E+02 | 2.67686E+04 |
| O | 1.42167E−09 | 4.99659E−07 | 1.04350E−01 | −9.36455E+01 | −4.21097E+03 |

TABLE 7

| Lens surfaces | S8 | S9 | S10 | S11 | S12 |
|---|---|---|---|---|---|
| Curvature radius | −5.53466E+00 | −5.70916E+00 | −3.18897E+00 | −1.22822E+03 | 6.17200E+00 |
| k | 3.15173E−01 | 4.47688E+00 | 3.41658E−01 | −1.00000E+00 | −4.25718E+00 |
| A | 2.39545E−02 | 4.69632E−02 | −5.47044E−02 | −2.28361E−01 | −1.79637E−01 |
| B | −8.55766E−01 | −8.88684E−01 | −4.49653E−02 | 7.08834E−01 | 3.74039E−01 |
| C | 1.31289E+01 | 1.04923E+01 | 1.42455E+00 | −3.62202E+00 | −1.00142E+00 |
| D | −1.27053E+02 | −8.35655E+01 | −1.33648E+01 | 1.30683E+01 | 1.95733E+00 |
| E | 8.12617E+02 | 4.53963E+02 | 7.05430E+01 | −3.35936E+01 | −2.74510E+00 |
| F | −3.57505E+03 | −1.72282E+03 | −2.44148E+02 | 6.27513E+01 | 2.84898E+00 |
| G | 1.11067E+04 | 4.64909E+03 | 5.86713E+02 | −8.59768E+01 | −2.22274E+00 |
| H | −2.47025E+04 | −8.99960E+03 | −1.00372E+03 | 8.66273E+01 | 1.30758E+00 |
| J | 3.94422E+04 | 1.24964E+04 | 1.23125E+03 | −6.38966E+01 | −5.75535E−01 |
| K | −4.48081E+04 | −1.23156E+04 | −1.07493E+03 | 3.40305E+01 | 1.86084E−01 |
| L | 3.53294E+04 | 8.39538E+03 | 6.51600E+02 | −1.27267E+01 | −4.27853E−02 |
| M | −1.83689E+04 | −3.75904E+03 | −2.60461E+02 | 3.16956E+00 | 6.61002E−03 |
| N | 5.66165E+03 | 9.93441E+02 | 6.16808E+01 | −4.72053E−01 | −6.14500E−04 |
| O | −7.83343E+02 | −1.17299E+02 | −6.54889E+00 | 3.18137E−02 | 2.59636E−05 |

TABLE 8

| Lens surfaces | S13 | S14 | S15 | S16 |
|---|---|---|---|---|
| Curvature radius | −1.87208E+01 | −1.17680E+00 | 1.26115E+00 | 6.98191E−01 |
| k | 6.63171E+01 | −1.49276E+00 | −9.23045E+00 | −3.20971E+00 |
| A | −3.73375E−02 | 3.20332E−02 | 6.01089E−02 | 1.83660E−02 |
| B | 1.00511E−01 | 1.18105E−02 | −8.04553E−02 | −4.87110E−02 |
| C | −1.39936E−01 | −2.61504E−02 | 4.25638E−02 | 3.16317E−02 |
| D | 9.69677E−02 | −2.00841E−02 | −1.31918E−02 | −1.21212E−02 |
| E | −9.13244E−03 | 6.70804E−02 | 2.35638E−03 | 3.10847E−03 |
| F | −4.68279E−02 | −6.89473E−02 | −1.56211E−04 | −5.60999E−04 |
| G | 4.93501E−02 | 4.15993E−02 | −3.07273E−05 | 7.31064E−05 |
| H | −2.79746E−02 | −1.66741E−02 | 9.84267E−06 | −6.95956E−06 |
| J | 1.03988E−02 | 4.63288E−03 | −1.35258E−06 | 4.84098E−07 |
| K | −2.64923E−03 | −9.01168E−04 | 1.13617E−07 | −2.43162E−08 |
| L | 4.60532E−04 | 1.20941E−04 | −6.17187E−09 | 8.58001E−10 |
| M | −5.23795E−05 | −1.07023E−05 | 2.12488E−10 | −2.01571E−11 |
| N | 3.51960E−06 | 5.63197E−07 | −4.23057E−12 | 2.82847E−13 |
| O | −1.06027E−07 | −1.33659E−08 | 3.71869E−14 | −1.79196E−15 |

Example 3

Figure 9:
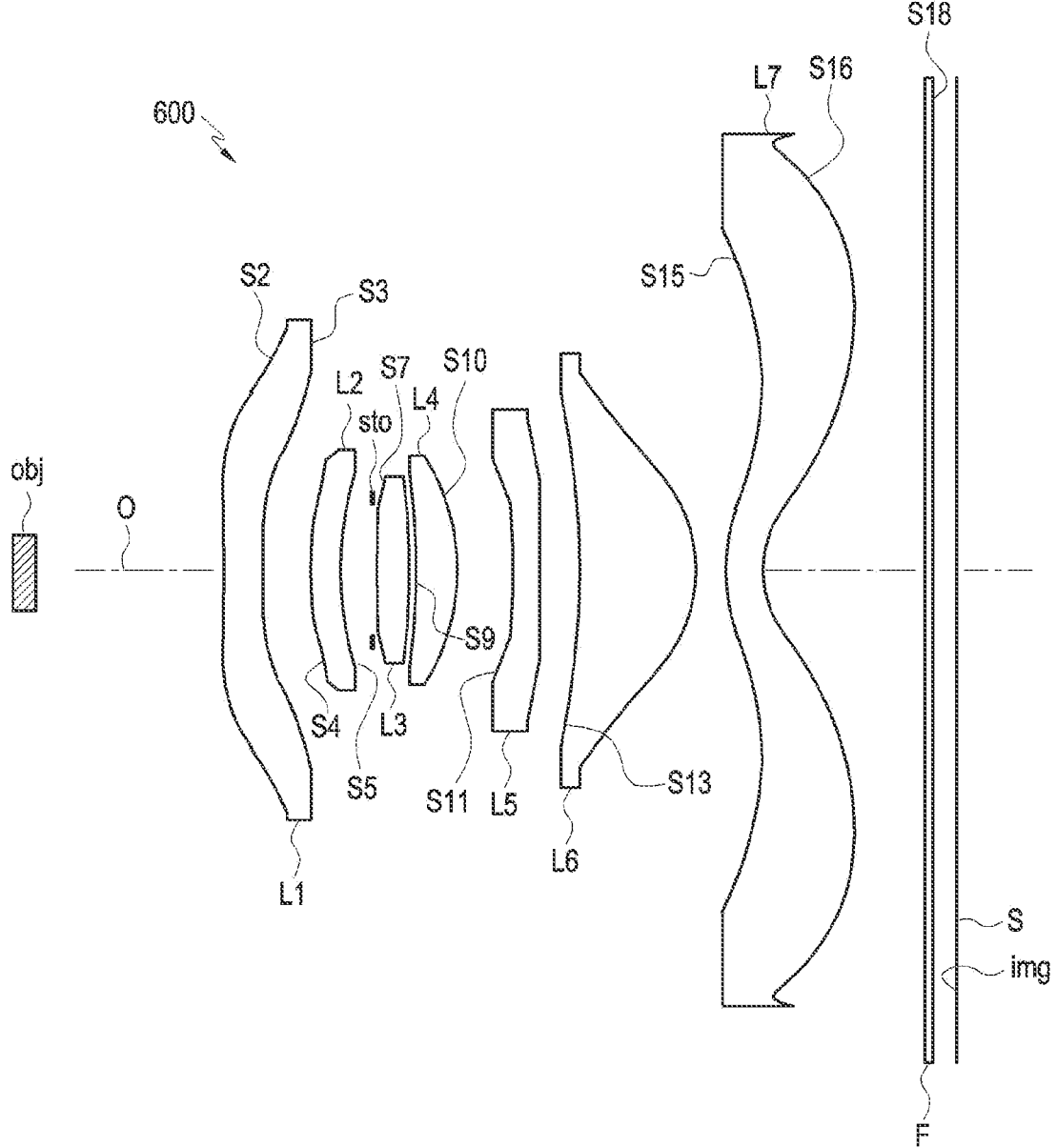
FIG. 9 is a view illustrating the configuration of a lens assembly according to still another one of the embodiments of the disclosure.
Figures 10A, 10B, 10C:
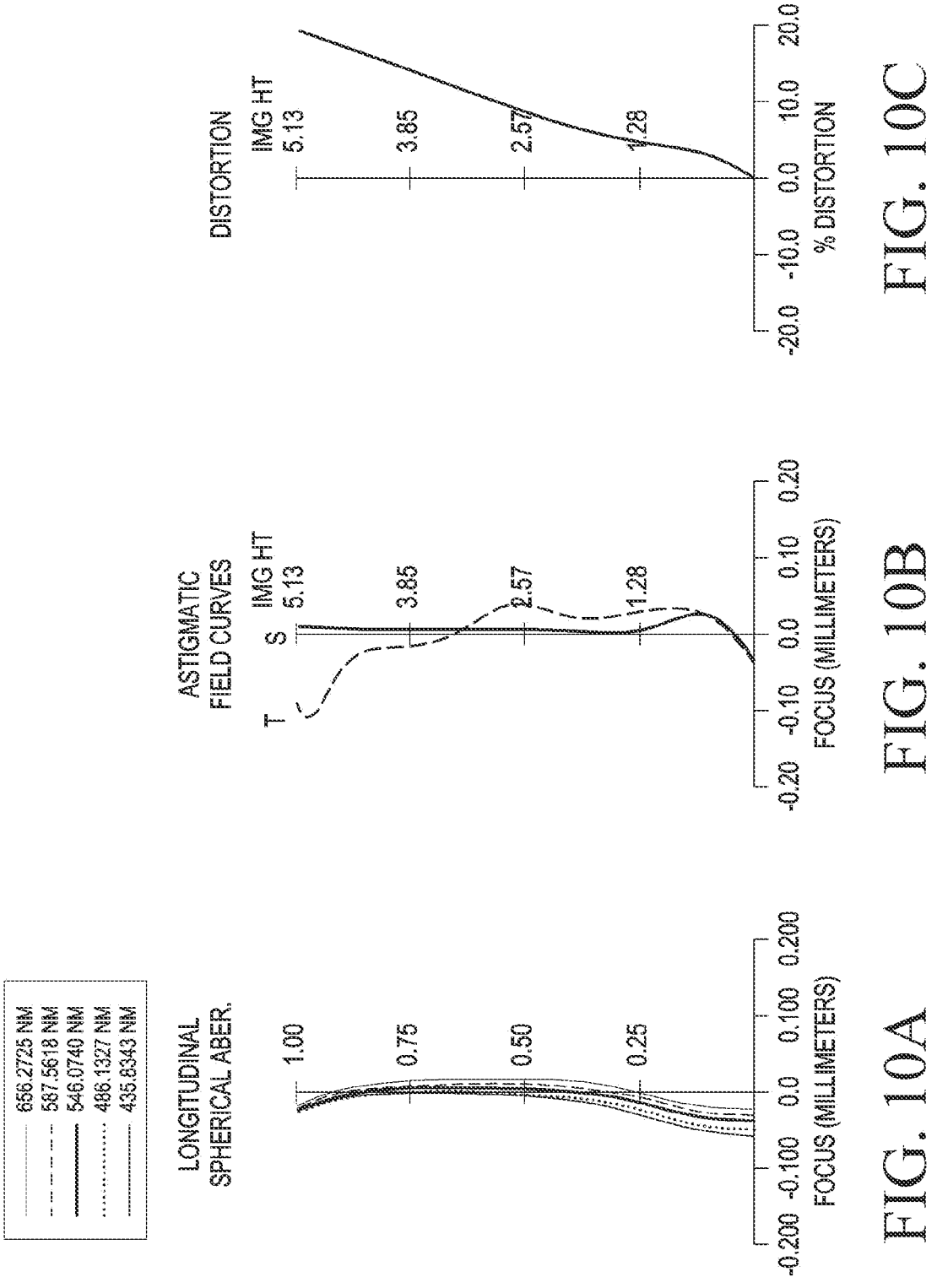
FIGS. 10A, 10B, and 10C are graphs illustrating spherical aberration, astigmatism, and distortion rate of a lens assembly according to still another one of the embodiments of the disclosure.

FIG. 9 is a configuration view illustrating a lens assembly 600 (e.g., the lens assembly 400 in FIG. 5) according to another one of the embodiments of the disclosure. FIGS. 6A, 6B, and 6C are graphs illustrating spherical aberration, astigmatism, and distortion rate of the lens assembly 600 according to another one of the embodiments of the disclosure.

In the lens assembly 600 of FIG. 9, the focal length may be about 2.9 mm, the half field of view may be about 56 degrees, and the F-number may be about 2.3. The lens assembly 600 and/or the lenses L1, L2, L3, L4, L5, L6, and L7 may be manufactured with the specifications shown in Table 9 below while satisfying the above-mentioned conditions with respect to the refractive powers, lens surface shapes, refractive indices, and/or the like, and may have aspherical coefficients of Tables 10 to 12.

TABLE 9

| Lens surfaces | Radius of curvature | Thickness or air gap | Effective focal length | Re- fractive index | Abbe num- ber |
|---|---|---|---|---|---|
| obj | infinity | infinity | | | |
| S1 | infinity | 0.03002 | | | |
| S2* | −5.07435 | 0.42241 | −13.405 | 1.54405 | 56.11 |
| S3* | −17.00743 | 0.49635 | | | |
| S4* | 3.27145 | 0.30804 | 28.748 | 1.61444 | 25.94 |
| S5* | 3.86245 | 0.35230 | | | |
| sto | infinity | 0.04219 | | | |
| S7* | 13.31262 | 0.32540 | 7.255 | 1.54405 | 56.11 |
| S8* | −5.59556 | 0.04872 | | | |
| S9* | −5.70916 | 0.44226 | 12.450 | 1.54405 | 56.11 |
| S10* | −3.18897 | 0.45622 | | | |

TABLE 9-continued

| Lens surfaces | Radius of curvature | Thickness or air gap | Effective focal length | Re- fractive index | Abbe num- ber |
|---|---|---|---|---|---|
| S11* | −139.67602 | 0.28185 | −9.206 | 1.66121 | 20.35 |
| S12* | 6.44547 | 0.40686 | | | |
| S13* | −18.28906 | 1.42041 | 2.165 | 1.54405 | 56.11 |
| S14* | −1.14169 | 0.11903 | | | |
| S15* | 1.20825 | 0.40000 | −3.50986 | 1.65101 | 21.49 |
| S16* | 0.68903 | 1.49054 | | | |
| S17 | infinity | 0.11 | infinity | 1.5168 | 64.2 |
| S18 | infinity | 0.11196 | | | |
| img | infinity | 0.03546 | | | |

TABLE 10

| Lens surfaces | S2 | S3 | S4 | S5 | S7 |
|---|---|---|---|---|---|
| Curvature radius | −5.07435E+00 | −1.70074E+01 | 3.27145E+00 | 3.86245E+00 | 1.33126E+01 |
| k | −1.33208E+02 | −9.16804E+02 | −7.7202E−01 | 1.04067E+01 | 8.11339E+01 |
| A | 4.20126E−02 | 1.52622E−01 | 2.79255E−02 | 3.02210E−02 | 4.18065E−02 |
| B | 6.41885E−02 | −4.92420E−02 | 1.22661E−02 | −6.12338E−01 | −1.51275E+00 |
| C | −1.31781E−01 | −7.48789E−02 | −1.07368E+00 | 6.15847E+00 | 2.67826E+01 |
| D | 1.45111E−01 | 2.28212E−01 | 6.96048E+00 | −4.56389E+01 | −3.01524E+02 |
| E | −1.08712E−01 | −3.38587E−01 | −2.66610E+01 | 2.41716E+02 | 2.30305E+03 |
| F | 5.84436E−02 | 3.33434E−01 | 6.85628E+01 | −9.23546E+02 | −1.24429E+04 |
| G | −2.29778E−02 | −2.31874E−01 | −1.24016E+02 | 2.57318E+03 | 4.87442E+04 |
| H | 6.64112E−03 | 1.15490E−01 | 1.60892E+02 | −5.26070E+03 | −1.40017E+05 |
| J | −1.40475E−03 | −4.11915E−02 | −1.50373E+02 | 7.87731E+03 | 2.94770E+05 |
| K | 2.14211E−04 | 1.04167E−02 | 1.00381E+02 | −8.52918E+03 | −4.49114E+05 |
| L | −2.28545E−05 | −1.82296E−03 | −4.66870E+01 | 6.49152E+03 | 4.81351E+05 |
| M | 1.61410E−06 | 2.10010E−04 | 1.43735E+01 | −3.28983E+03 | −3.43726E+05 |
| N | −6.75887E−08 | −1.43345E−05 | −2.63322E+00 | 9.95505E+02 | 1.46627E+05 |
| O | 1.26640E−09 | 4.39418E−07 | 2.17372E−01 | −1.35925E+02 | −2.82341E+04 |

TABLE 11

| Lens surfaces | S8 | S9 | S10 | S11 | S12 |
|---|---|---|---|---|---|
| Curvature radius | −5.59556E+00 | −5.70916E+00 | −3.18897E+00 | −1.39676E+02 | 6.44547E+00 |
| k | 6.43080E−01 | 4.47688E+00 | 3.41658E−01 | −1.00000E+00 | −4.48564E+00 |
| A | 2.68815E−02 | 4.69632E−02 | −5.47044E−02 | −2.49629E−01 | −1.91800E−01 |
| B | −9.37442E−01 | −8.88685E−01 | −4.49653E−02 | 8.92883E−01 | 4.70107E−01 |
| C | 1.39525E+01 | 1.04923E+01 | 1.42455E+00 | −4.47141E+00 | −1.36346E+00 |
| D | −1.32131E+02 | −8.35656E+01 | −1.33648E+01 | 1.51363E+01 | 2.78856E+00 |
| E | 8.35377E+02 | 4.53963E+02 | 7.05430E+01 | −3.57056E+01 | −4.00626E+00 |
| F | −3.65854E+03 | −1.72282E+03 | −2.44148E+02 | 6.05807E+01 | 4.16719E+00 |
| G | 1.13614E+04 | 4.64909E+03 | 5.86713E+02 | −7.52530E+01 | −3.19606E+00 |
| H | −2.53081E+04 | −8.99960E+03 | −1.00372E+03 | 6.89633E+01 | 1.82138E+00 |
| J | 4.04927E+04 | 1.24965E+04 | 1.23125E+03 | −4.65375E+01 | −7.69190E−01 |
| K | −4.60792E+04 | −1.23156E+04 | −1.07493E+03 | 2.28427E+01 | 2.37320E−01 |
| L | 3.63607E+04 | 8.39539E+03 | 6.51600E+02 | −7.94195E+00 | −5.19407E−02 |
| M | −1.88988E+04 | −3.75905E+03 | −2.60461E+02 | 1.85827E+00 | 7.63463E−03 |
| N | 5.81598E+03 | 9.93441E+02 | 6.16808E+01 | −2.63363E−01 | −6.75880E−04 |
| O | −8.02477E+02 | −1.17299E+02 | −6.54889E+00 | 1.71494E−02 | 2.72497E−05 |

TABLE 12

| Lens surfaces | S13 | S14 | S15 | S16 |
|---|---|---|---|---|
| Curvature radius | -1.82891E+01 | -1.14169E+00 | 1.20825E+00 | 6.89027E-01 |
| k | 6.76291E+01 | -1.47671E+00 | -8.69583E+00 | -3.20699E+00 |
| A | -3.70574E-02 | -1.14404E-03 | 5.68266E-02 | 1.52074E-02 |
| B | 8.81496E-02 | 1.55908E-01 | -6.58435E-02 | -3.81901E-02 |
| C | -1.00195E-01 | -3.50978E-01 | 2.94474E-02 | 2.15162E-02 |
| D | 3.99867E-02 | 4.42541E-01 | -7.78071E-03 | -7.14815E-03 |
| E | 3.54937E-02 | -3.78720E-01 | 1.26995E-03 | 1.60283E-03 |
| F | -6.33945E-02 | 2.31994E-01 | -1.11851E-04 | -2.55274E-04 |
| G | 4.70613E-02 | -1.03682E-01 | -1.81560E-07 | 2.95889E-05 |
| H | -2.19269E-02 | 3.40329E-02 | 1.43975E-06 | -2.52123E-06 |
| J | 6.99904E-03 | -8.18126E-03 | -2.03469E-07 | 1.57733E-07 |
| K | -1.56494E-03 | 1.42047E-03 | 1.57546E-08 | -7.15193E-09 |
| L | 2.42489E-04 | -1.73013E-04 | -7.67310E-10 | 2.28403E-10 |
| M | -2.49133E-05 | 1.39958E-05 | 2.34633E-11 | -4.86516E-12 |
| N | 1.53075E-06 | -6.74143E-07 | -4.13436E-13 | 6.19587E-14 |
| O | -4.26414E-08 | 1.46135E-08 | 3.21147E-15 | -3.56327E-16 |

Example 4

Figure 11:
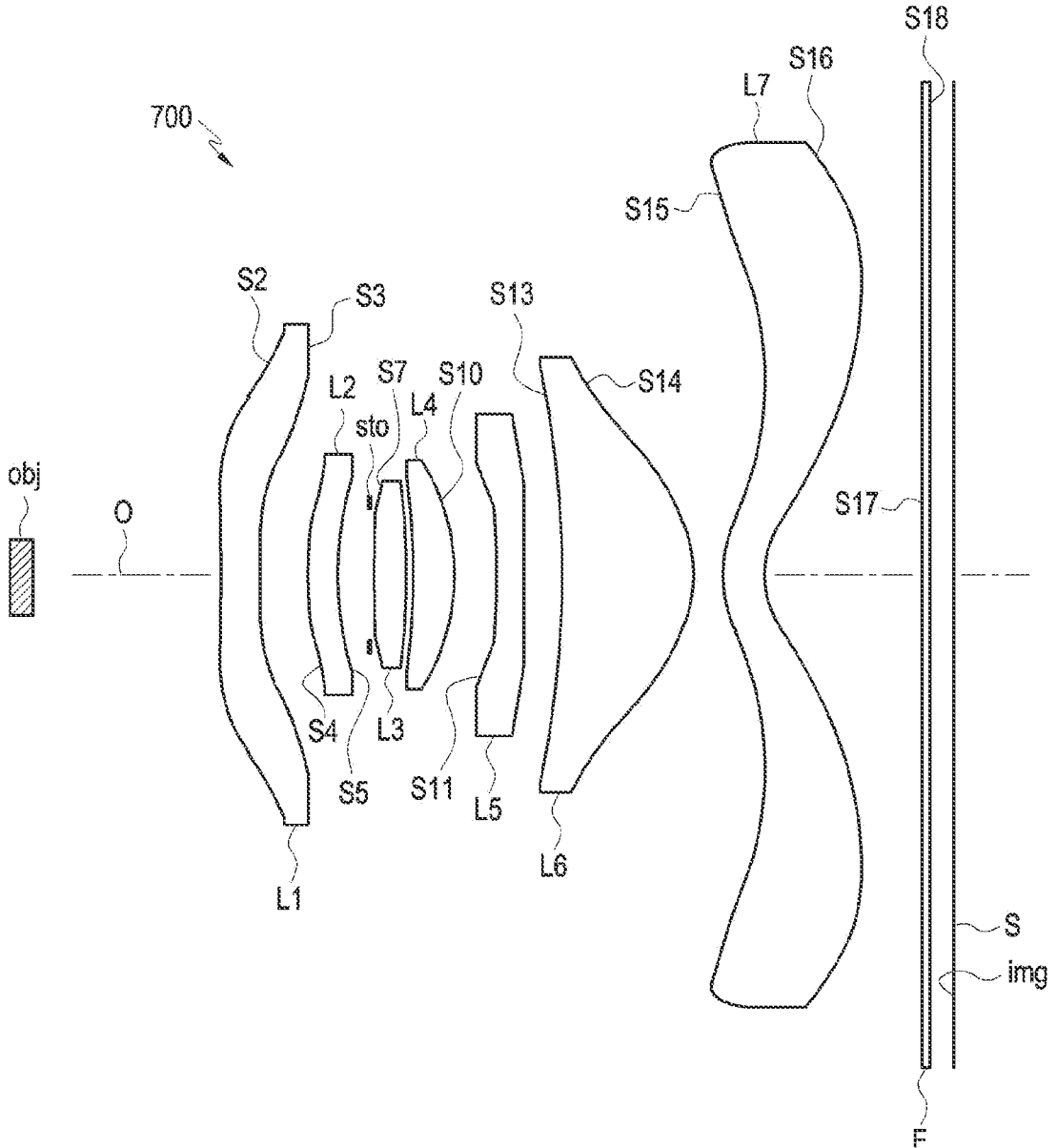
FIG. 11 is a view illustrating the configuration of a lens assembly according to still another one of the embodiments of the disclosure.
Figures 12A, 12B, 12C:
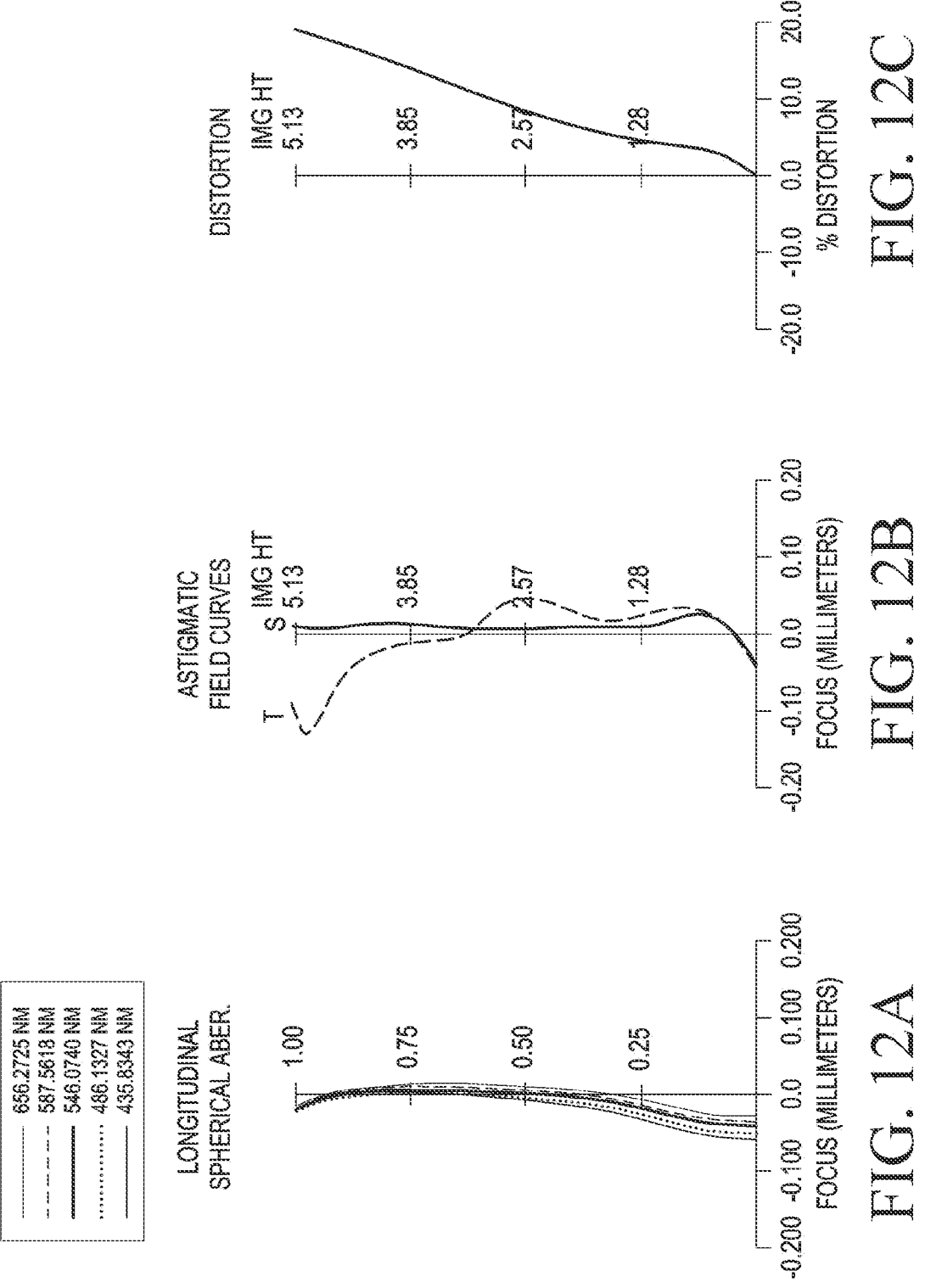
FIGS. 12A, 12B, and 12C are graphs illustrating spherical aberration, astigmatism, and distortion rate of a lens assembly according to still another one of the embodiments of the disclosure.

FIG. 11 is a configuration view illustrating a lens assembly 700 (e.g., the lens assembly 400 in FIG. 5) according to another one of the embodiments of the disclosure. FIGS. 12A, 12B, and 12C are graphs illustrating spherical aberration, astigmatism, and distortion rate of the lens assembly 700 according to another one of the embodiments of the disclosure.

In the lens assembly 700 of FIG. 11, the focal length may be about 2.9 mm, the half field of view may be about 56 degrees, and the F-number may be about 2.2. The lens assembly 700 and/or the lenses L1, L2, L3, L4, L5, L6, and L7 may be manufactured with the specifications shown in Table 13 below while satisfying the above-mentioned conditions with respect to the refractive powers, lens surface shapes, refractive indices, and/or the like, and may have aspherical coefficients of Tables 14 to 16.

TABLE 13

| Lens surfaces | Radius of curvature | Thickness or air gap | Effective focal length | Refractive index | Abbe number |
|---|---|---|---|---|---|
| obj | infinity | infinity | | | |
| S1 | infinity | 0.03002 | | | |
| S2* | -5.04950 | 0.42183 | -13.371 | 1.54405 | 56.11 |
| S3* | -16.83613 | 0.49634 | | | |
| S4* | 3.26589 | 0.30467 | 28.683 | 1.61444 | 25.94 |
| S5* | 3.85771 | 0.35167 | | | |
| sto | infinity | 0.04114 | | | |
| S7* | 13.24993 | 0.32877 | 7.257 | 1.54405 | 56.11 |
| S8* | -5.60799 | 0.04833 | | | |
| S9* | -5.70916 | 0.44226 | 12.450 | 1.54405 | 56.11 |
| S10* | -3.18897 | 0.45622 | | | |
| S11* | -95.13428 | 0.28376 | -9.062 | 1.67141 | 19.25 |
| S12* | 6.59139 | 0.40601 | | | |
| S13* | -18.24399 | 1.41896 | 2.163 | 1.54405 | 56.11 |
| S14* | -1.14034 | 0.12604 | | | |
| S15* | 1.20249 | 0.40000 | -3.5377 | 1.65101 | 21.49 |
| S16* | 0.68822 | 1.49054 | | | |
| S17 | infinity | 0.11 | infinity | 1.5168 | 64.2 |
| S18 | infinity | 0.1003 | | | |
| img | infinity | 0.04315 | | | |

TABLE 14

| Lens surfaces | S2 | S3 | S4 | S5 | S7 |
|---|---|---|---|---|---|
| Curvature radius | -5.04950E+00 | -1.68361E+01 | 3.26589E+00 | 3.85771E+00 | 1.32499E+01 |
| k | -1.30061E+02 | -9.14327E+02 | -7.69482E-01 | 1.04143E+01 | 8.20743E+01 |
| A | 4.11166E-02 | 1.53827E-01 | 2.52501E-02 | 2.56956E-02 | 4.12029E-02 |
| B | 6.70986E-02 | -5.68724E-02 | 7.31300E-02 | -5.35295E-01 | -1.46084E+00 |
| C | -1.37009E-01 | -4.70258E-02 | -1.69344E+00 | 5.49141E+00 | 2.54522E+01 |
| D | 1.50962E-01 | 1.64534E-01 | 1.06525E+00 | -4.21471E+01 | -2.83890E+02 |
| E | -1.13159E-01 | -2.43125E-01 | -4.09259E+01 | 2.29789E+02 | 2.15923E+03 |
| F | 6.08564E-02 | 2.35783E-01 | 1.06300E+02 | -8.94884E+02 | -1.16491E+04 |
| G | -2.39379E-02 | -1.61756E-01 | -1.94501E+02 | 2.52017E+03 | 4.56050E+04 |
| H | 6.92423E-03 | 7.95652E-02 | 2.55325E+02 | -5.17749E+03 | -1.30825E+05 |
| J | -1.46642E-03 | -2.79947E-02 | -2.41454E+02 | 7.76171E+03 | 2.74629E+05 |
| K | 2.23981E-04 | 6.96815E-03 | 1.63063E+02 | -8.39564E+03 | -4.16440E+05 |
| L | -2.39460E-05 | -1.19730E-03 | -7.67021E+01 | 6.37645E+03 | 4.43395E+05 |
| M | 1.69539E-06 | 1.35113E-04 | 2.38708E+01 | -3.22331E+03 | -3.14043E+05 |
| N | -7.12044E-08 | -9.01608E-06 | -4.41759E+00 | 9.72859E+02 | 1.32711E+05 |
| O | 1.33896E-09 | 2.69778E-07 | 3.68053E-01 | -1.32513E+02 | -2.52936E+04 |

TABLE 15

| Lens surfaces | S8 | S9 | S10 | S11 | S12 |
|---|---|---|---|---|---|
| Curvature radius | -5.60799E+00 | -5.70916E+00 | -3.18897E+00 | -9.51343E+01 | 6.59139E+00 |
| k | 7.25699E-01 | 4.47688E+00 | 3.41658E-01 | -1.00000E+00 | -4.92532E+00 |
| A | 2.46870E-02 | 4.69632E-02 | -5.47044E-02 | -2.39998E-01 | -1.93568E-01 |
| B | -7.85713E-01 | -8.88684E-01 | -4.49653E-02 | 7.86268E-01 | 4.73911E-01 |
| C | 1.07713E+01 | 1.04923E+01 | 1.42455E+00 | -3.76135E+00 | -1.35419E+00 |
| D | -9.62238E+01 | -8.35655E+01 | -1.33648E+01 | 1.21572E+01 | 2.71140E+00 |
| E | 5.81675E+02 | 4.53963E+02 | 7.05430E+01 | -2.73982E+01 | -3.79707E+00 |
| F | -2.45522E+03 | -1.72282E+03 | -2.44148E+02 | 4.45830E+01 | 3.84144E+00 |

TABLE 15-continued

| Lens surfaces | S8 | S9 | S10 | S11 | S12 |
|---|---|---|---|---|---|
| G | 7.38262E+03 | 4.64909E+03 | 5.86713E+02 | −5.34228E+01 | −2.86522E+00 |
| H | −1.59572E+04 | −8.99960E+03 | −1.00372E+03 | 4.75485E+01 | 1.59048E+00 |
| J | 2.47843E+04 | 1.24964E+04 | 1.23125E+03 | −3.13859E+01 | −6.56044E−01 |
| K | −2.73615E+04 | −1.23156E+04 | −1.07493E+03 | 1.51795E+01 | 1.98361E−01 |
| L | 2.09204E+04 | 8.39538E+03 | 6.51600E+02 | −5.23998E+00 | −4.26978E−02 |
| M | −1.05190E+04 | −3.75904E+03 | −2.60461E+02 | 1.22736E+00 | 6.19506E−03 |
| N | 3.12563E+03 | 9.93441E+02 | 6.16808E+01 | −1.75667E−01 | −5.43370E−04 |
| O | −4.15496E+02 | −1.17299E+02 | −6.54889E+00 | 1.16531E−02 | 2.17880E−05 |

TABLE 16

| Lens surfaces | S13 | S14 | S15 | S16 |
|---|---|---|---|---|
| Curvature radius | −1.82440E+01 | −1.14034E+00 | 1.20249E+00 | 6.88225E−01 |
| k | 6.77346E+01 | −1.47669E+00 | −8.64655E+00 | −3.19669E+00 |
| A | −3.64752E−02 | −3.63631E−04 | 5.58745E−02 | 1.53203E−02 |
| B | 8.73921E−02 | 1.55316E−01 | −6.38324E−02 | −3.85188E−02 |
| C | −9.93531E−02 | −3.60634E−01 | 2.76749E−02 | 2.17587E−02 |
| D | 3.66399E−02 | 4.74709E−01 | −6.83726E−03 | −7.25907E−03 |
| E | 4.41678E−02 | −4.28687E−01 | 9.38131E−04 | 1.63792E−03 |
| F | −7.55653E−02 | 2.79119E−01 | −3.13030E−05 | −2.63115E−04 |
| G | 5.75110E−02 | −1.33193E−01 | −1.40347E−05 | 3.08346E−05 |
| H | −2.78188E−02 | 4.68041E−02 | 3.15167E−06 | −2.66249E−06 |
| J | 9.25554E−03 | −1.20615E−02 | −3.55940E−07 | 1.69153E−07 |
| K | −2.15723E−03 | 2.24664E−03 | 2.54531E−08 | −7.80349E−09 |
| L | 3.47577E−04 | −2.93764E−04 | −1.19695E−09 | 2.53992E−10 |
| M | −3.69745E−05 | 2.55378E−05 | 3.60532E−11 | −5.52274E−12 |
| N | 2.33974E−06 | −1.32398E−06 | −6.32749E−13 | 7.19032E−14 |
| O | −6.67379E−08 | 3.09545E−08 | 4.93075E−15 | −4.23388E−16 |

Example 5

Figure 13:
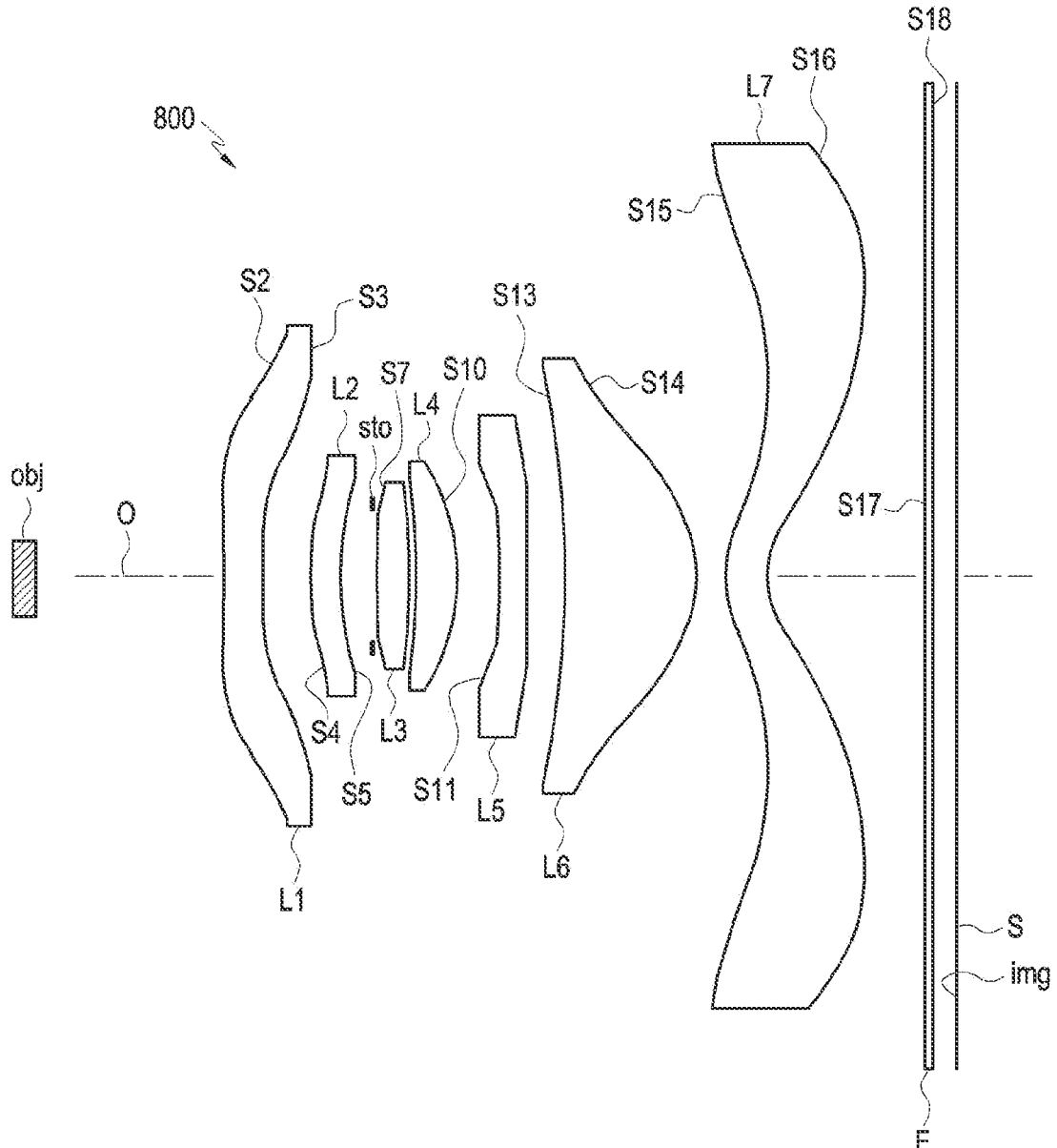
FIG. 13 is a view illustrating the configuration of a lens assembly according to still another one of the embodiments of the disclosure.
Figures 14A, 14B, 14C:
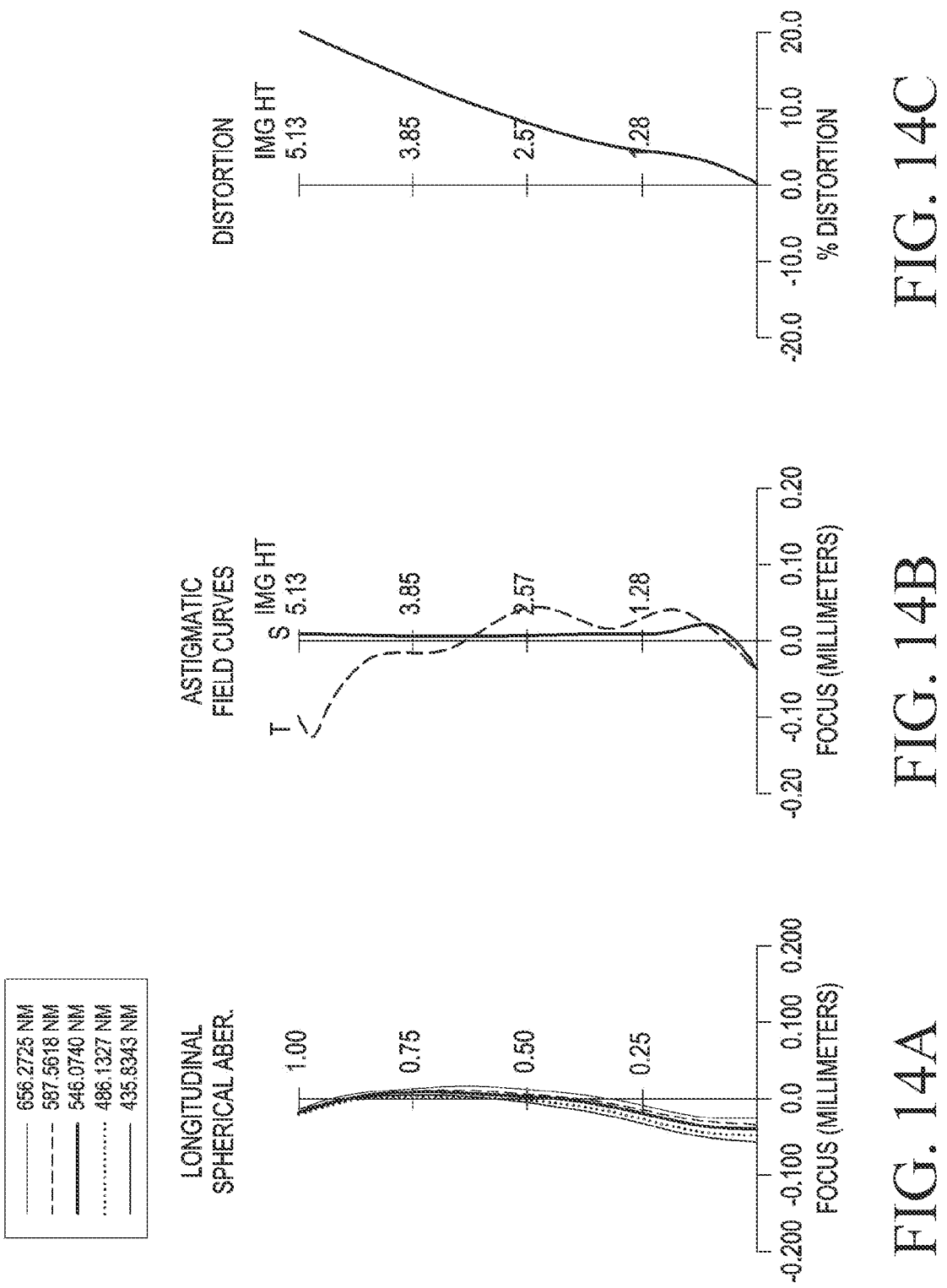
FIGS. 14A, 14B, and 14C are graphs illustrating spherical aberration, astigmatism, and distortion rate of a lens assembly according to still another one of the embodiments of the disclosure.

FIG. 13 is a configuration view illustrating a lens assembly 800 (e.g., the lens assembly 400 in FIG. 5) according to another one of the embodiments of the disclosure. FIGS. 14A, 14B, and 14C are graphs illustrating spherical aberration, astigmatism, and distortion rate of the lens assembly 800 according to another one of the embodiments of the disclosure.

In the lens assembly 800 of FIG. 13, the focal length may be about 2.9 mm, the half field of view may be about 56 degrees, and the F-number may be about 2.2. The lens assembly 800 and/or the lenses L1, L2, L3, L4, L5, L6, and L7 may be manufactured with the specifications shown in Table 17 below while satisfying the above-mentioned conditions with respect to the refractive powers, lens surface shapes, refractive indices, and/or the like, and may have aspherical coefficients of Tables 18 to

TABLE 17

| Lens surfaces | Radius of curvature | Thickness or air gap | Effective focal length | Refractive index | Abbe number |
|---|---|---|---|---|---|
| obj | infinity | infinity | | | |
| S1 | infinity | 0.03000 | | | |
| S2* | −4.99996 | 0.42194 | −13.332 | 1.54405 | 56.11 |
| S3* | −16.41913 | 0.49628 | | | |
| S4* | 3.25939 | 0.30240 | 28.512 | 1.61444 | 25.94 |
| S5* | 3.85429 | 0.35141 | | | |
| sto | infinity | 0.04003 | | | |
| S7* | 13.23023 | 0.32637 | 7.268 | 1.54405 | 56.11 |
| S8* | −5.62430 | 0.04847 | | | |
| S9* | −5.70916 | 0.44226 | 12.450 | 1.54405 | 56.11 |
| S10* | −3.18897 | 0.45622 | | | |
| S11* | −70.72958 | 0.28555 | −9.067 | 1.67141 | 19.25 |
| S12* | 6.75973 | 0.40153 | | | |
| S13* | −18.15717 | 1.42195 | 2.157 | 1.54405 | 56.11 |
| S14* | −1.13720 | 0.12789 | | | |
| S15* | 1.18945 | 0.40000 | −3.52989 | 1.66121 | 20.35 |
| S16* | 0.68432 | 1.49053 | | | |
| S17 | infinity | 0.11 | infinity | 1.5168 | 64.2 |
| S18 | infinity | 0.08228 | | | |
| img | infinity | 0.04107 | | | |

TABLE 18

| Lens surfaces | S2 | S3 | S4 | S5 | S7 |
|---|---|---|---|---|---|
| Curvature radius | −4.99997E+00 | −1.64191E+01 | 3.25940E+00 | 3.85429E+00 | 1.32302E+01 |
| k | −1.28424E+02 | −9.19523E+02 | −7.57499E−01 | 1.04225E+01 | 8.19622E+01 |
| A | 4.09839E−02 | 1.55576E−01 | 2.45546E−02 | 1.98071E−02 | 4.06848E−02 |
| B | 6.77472E−02 | −6.68987E−02 | 5.83070E−02 | −3.84447E−01 | −1.46534E+00 |
| C | −1.39211E−01 | −2.10197E−02 | −1.40671E+00 | 3.61431E+00 | 2.57439E+01 |
| D | 1.54887E−01 | 1.23822E−01 | 8.55372E+00 | −2.76681E+01 | −2.87099E+02 |
| E | −1.17339E−01 | −2.00308E−01 | −3.20018E+01 | 1.55262E+02 | 2.16845E+03 |
| F | 6.37633E−02 | 2.03586E−01 | 8.14555E+01 | −6.27970E+02 | −1.15676E+04 |
| G | −2.53280E−02 | −1.43868E−01 | −1.46749E+02 | 1.83746E+03 | 4.46896E+04 |
| H | 7.39408E−03 | 7.21517E−02 | 1.90307E+02 | −3.91257E+03 | −1.26494E+05 |
| J | −1.57972E−03 | −2.57208E−02 | −1.78193E+02 | 6.05870E+03 | 2.62298E+05 |
| K | 2.43353E−04 | 6.46302E−03 | 1.19338E+02 | −6.74435E+03 | −3.93616E+05 |
| L | −2.62391E−05 | −1.11898E−03 | −5.57269E+01 | 5.25171E+03 | 4.15640E+05 |

TABLE 18-continued

| Lens surfaces | S2 | S3 | S4 | S5 | S7 |
|---|---|---|---|---|---|
| M | 1.87400E−06 | 1.27150E−04 | 1.72304E+01 | −2.71202E+03 | −2.92599E+05 |
| N | −7.94347E−08 | −8.54409E−06 | −3.16981E+00 | 8.33391E+02 | 1.23151E+05 |
| O | 1.50888E−09 | 2.57589E−07 | 2.62649E−01 | −1.15222E+02 | −2.34197E+04 |

TABLE 19

| Lens surfaces | S8 | S9 | S10 | S11 | S12 |
|---|---|---|---|---|---|
| Curvature radius | −5.62430E+00 | −5.70916E+00 | −3.18897E+00 | −7.07296E+01 | 6.75973E+00 |
| k | 7.19685E−01 | 4.47688E+00 | 3.41658E−01 | −1.00000E+00 | −5.34955E+00 |
| A | 3.05937E−02 | 4.69632E−02 | −5.47044E−02 | −2.25876E−01 | −1.92298E−01 |
| B | −9.79080E−01 | −8.88684E−01 | −4.49653E−02 | 6.00407E−01 | 4.45540E−01 |
| C | 1.40383E+01 | 1.04923E+01 | 1.42455E+00 | −2.60776E+00 | −1.20992E+00 |
| D | −1.29556E+02 | −8.35655E+01 | −1.33648E+01 | 7.86599E+00 | 2.33083E+00 |
| E | 8.04555E+02 | 4.53963E+02 | 7.05430E+01 | −1.68510E+01 | −3.17061E+00 |
| F | −3.47898E+03 | −1.72282E+03 | −2.44148E+02 | 2.65641E+01 | 3.14475E+00 |
| G | 1.07033E+04 | 4.64909E+03 | 5.86713E+02 | −3.14261E+01 | −2.32077E+00 |
| H | −2.36732E+04 | −8.99960E+03 | −1.00372E+03 | 2.81102E+01 | 1.28597E+00 |
| J | 3.76655E+04 | 1.24964E+04 | 1.23125E+03 | −1.89383E+01 | −5.33756E−01 |
| K | −4.26700E+04 | −1.23156E+04 | −1.07493E+03 | 9.46892E+00 | 1.63487E−01 |
| L | 3.35493E+04 | 8.39538E+03 | 6.51600E+02 | −3.41442E+00 | −3.58388E−02 |
| M | −1.73877E+04 | −3.75904E+03 | −2.60461E+02 | 8.42188E−01 | 5.31697E−03 |
| N | 5.33922E+03 | 9.93440E+02 | 6.16808E+01 | −1.27613E−01 | −4.78280E−04 |
| O | −7.35525E+02 | −1.17299E+02 | −6.54889E+00 | 8.97932E−03 | 1.97095E−05 |

TABLE 20

| Lens surfaces | S13 | S14 | S15 | S16 |
|---|---|---|---|---|
| Curvature radius | −1.81572E+01 | −1.13720E+00 | 1.18946E+00 | 6.84325E−01 |
| k | 6.80080E+01 | −1.47518E+00 | −8.48793E+00 | −3.21982E+00 |
| A | −3.47224E−02 | −4.71363E−04 | 5.5376E−02 | 1.40929E−02 |
| B | 8.18106E−02 | 1.49997E−01 | −6.32385E−02 | −3.60753E−02 |
| C | −9.18589E−02 | −3.31678E−01 | 2.78996E−02 | 1.99017E−02 |
| D | 3.90938E−02 | 4.06077E−01 | −7.27122E−03 | −6.44346E−03 |
| E | 2.37282E−02 | −3.35173E−01 | 1.17138E−03 | 1.40555E−03 |
| F | −4.61464E−02 | 1.97429E−01 | −1.02374E−04 | −2.17702E−04 |
| G | 3.40144E−02 | −8.47796E−02 | 7.25411E−08 | 2.45546E−05 |
| H | −1.56691E−02 | 2.67443E−02 | 1.22819E−06 | −2.03823E−06 |
| J | 4.97794E−03 | −6.17885E−03 | −1.72070E−07 | 1.24396E−07 |
| K | −1.11917E−03 | 1.02993E−03 | 1.31308E−08 | −5.51048E−09 |
| L | 1.76368E−04 | −1.20076E−04 | −6.29457E−10 | 1.72162E−10 |
| M | −1.86313E−05 | 9.24705E−06 | 1.89397E−11 | −3.59155E−12 |
| N | 1.18799E−06 | −4.20362E−07 | −3.28428E−13 | 4.48288E−14 |
| O | −3.45725E−08 | 8.49097E−09 | 2.51154E−15 | −2.52752E−16 |

According to certain embodiments, the lens assemblies 400, 500, 600, 700, and 800 may include at least seven lenses to facilitate miniaturization and to provide aberration control performance suitable for an enlarged image sensor. For example, the lens assemblies 400, 500, 600, 700, and 800 according to an embodiment of the disclosure may be easily mounted on a miniaturized electronic device such as a smartphone, and high performance in photography may be implemented.

As described above, according to an embodiment of the present disclosure, a lens assembly (e.g., the lens assembly 400 in FIG. 5) and/or an electronic device (e.g., the electronic device 101, 102, 104, or 300 in FIGS. 1 to 4) may include at least seven lenses (e.g., the lenses L1, L2, L3, L4, L5, L6, and L7 in FIG. 5) arranged sequentially along an optical axis (e.g., the optical axis O in FIG. 5) direction from an object (e.g., the object obj in FIG. 5) side to an image sensor (e.g., the image sensor S in FIG. 5) side, wherein a first lens (e.g., the first lens L1 of FIG. 5) disposed first from the object side may have negative refractive power and may include a concave object side surface and a convex image sensor side surface, a second lens (e.g., the second lens L2 in FIG. 5) disposed second from the object side may have positive refractive power and may include an object side surface and an image sensor side surface at least one of which is aspherical, and a third lens (e.g., the third lens L3 in FIG. 5) disposed third from the object side may have positive refractive power, and wherein the lens assembly may satisfy Conditions 1, 2, and 3 below.

$$N23 \geq 1.6 \qquad \text{[Conditional Expression 1]}$$

$$N7 \geq 1.6 \qquad \text{[Conditional Expression 2]}$$

$$HFOV \geq 50° \qquad \text{[Conditional Expression 3]}$$

Here, "N23" may be a refractive index of one of the second lens and the third lens, "N7" may be a refractive index of a seventh lens (e.g., the seventh lens L7 in FIG. 5) disposed seventh from the object side, and "HFOV" may be a half angle of view of the lens assembly in "degrees".

According to an embodiment, at least one of the at least seven lenses may be configured to perform focus adjustment by moving along the optical axis direction.

According to an embodiment, at least one of an object side surface and an image sensor side surface of the seventh lens may include an inflection point.

According to an embodiment, the image sensor side surface of the seventh lens may be concave.

According to an embodiment, at least one of the at least seven lenses may be configured to perform focus adjustment by moving along the optical axis direction. According to an embodiment, the seventh lens may have negative refractive power.

According to various embodiments, the refractive index of the second lens may be 1.6 or more, and the refractive index of the third lens may be 1.6 or less.

According to an embodiment of the present disclosure, a lens assembly (e.g., the lens assembly 400 in FIG. 5) and/or an electronic device (e.g., the electronic device 101, 102, 104, or 300 in FIGS. 1 to 4) may include at least seven lenses (e.g., the lenses L1, L2, L3, L4, L5, L6, and L7 in FIG. 5) arranged sequentially along an optical axis (e.g., the optical axis O in FIG. 5) direction from an object (e.g., the object obj in FIG. 5) side to an image sensor (e.g., the image sensor S in FIG. 5) side, wherein a first lens (e.g., the first lens L1 of FIG. 5) disposed first from the object side may have negative refractive power and may include a concave object side surface and a convex image sensor side surface, a second lens (e.g., the second lens L2 in FIG. 5) disposed second from the object side may have positive refractive power and may include an object side surface and an image sensor side surface at least one of which is aspherical, and a third lens (e.g., the third lens L3 in FIG. 5) disposed third from the object side may have positive refractive power, and wherein the lens assembly may satisfy Conditions 4, 5, and 6 below.

$$N2 \geq 1.6 \qquad \text{[Conditional Expression 4]}$$

$$N7 \geq 1.6 \qquad \text{[Conditional Expression 5]}$$

$$HFOV \geq 50° \qquad \text{[Conditional Expression 6]}$$

Here, "N2" may be a refractive index of the second lens, "N7" may be a refractive index of a seventh lens (e.g., the seventh lens L7 in FIG. 5) disposed seventh from the object side, and "HFOV" may be a half angle of view of the lens assembly in "degrees".

According to an embodiment, at least one of the at least seven lenses may be configured to perform focus adjustment by moving along the optical axis direction.

According to an embodiment, at least one of an object side surface and an image sensor side surface of the seventh lens may include an inflection point.

According to an embodiment, the image sensor side surface of the seventh lens may be concave.

According to an embodiment, at least one of the at least seven lenses may be configured to perform focus adjustment by moving along the optical axis direction. According to an embodiment, the seventh lens may have negative refractive power.

According to an embodiment of the disclosure, an electronic device (e.g., the electronic device 101, 102, 104, or 300 in FIGS. 1 to 4) may include at least seven lenses (e.g., the lens assembly 210 in FIG. 2 or the lenses (L1, L2, L3, L4, L5, L6, and L7 in FIG. 5) sequentially arranged along an optical axis (e.g., the optical axis O in FIG. 5) from on object (e.g., the object obj in FIG. 5) side to an image sensor (e.g., the image sensor S in FIG. 5) side, an image sensor (e.g., the image sensor 230 or S in FIG. 2 or FIG. 5) aligned with the at least seven lenses on the optical axis, and configured to receive light focused or guide by the at least seven lenses, and a processor (e.g., the processor 120 of FIG. 1 or the image signal processor 260 in FIG. 2) configured to acquire an image based on the light received from the image sensor, wherein a first lens (e.g., the first lens L1 of FIG. 5) disposed first from the object side may have negative refractive power and may include a concave object side surface and a convex image sensor side surface, a second lens (e.g., the second lens L2 in FIG. 5) disposed second from the object side may include positive refractive power and may include an object side surface and an image sensor side surface at least one of which is aspherical, and a third lens (e.g., the third lens L3 in FIG. 5) disposed third from the object side may have positive refractive power, and wherein the electronic device may satisfy the Conditional Expressions 7, 8, and 9 below.

$$N23 \geq 1.6 \qquad \text{[Conditional Expression 7]}$$

$$N7 \geq 1.6 \qquad \text{[Conditional Expression 8]}$$

$$HFOV \geq 50° \qquad \text{[Conditional Expression 9]}$$

Here, "N23" may be a refractive index of one of the second lens and the third lens, "N7" may be a refractive index of a seventh lens (e.g., the seventh lens L7 in FIG. 5) disposed seventh from the object side, and "HFOV" may be a half angle of view of the electronic device in "degrees".

According to an embodiment, the processor may be configured to perform focus adjustment by moving at least one of the at least seven lenses along the optical axis direction.

According to an embodiment, at least one of an object side surface and an image sensor side surface of the seventh lens may include an inflection point.

According to an embodiment, the image sensor side surface of the seventh lens may be concave.

According to an embodiment, at least one of the at least seven lenses may be configured to perform focus adjustment by moving along the optical axis direction. According to an embodiment, the seventh lens may have negative refractive power.

According to an embodiment, the refractive index of the second lens may be 1.6 or more, and the refractive index of the third lens may be 1.6 or less.

Although the disclosure has been described with reference to various embodiments as an example, it should be understood that the various embodiments are intended to be exemplary and are not limiting the disclosure. It will be apparent to those skilled in the art that various changes can be made in form and detail without departing from the overall scope of the disclosure, including the appended claims and equivalents to the same.

What is claimed is:

1. A lens assembly comprising:

at least seven lenses sequentially arranged along an optical axis direction from an object side to an image sensor side, wherein a first lens disposed first from the object side has negative refractive power and includes a concave object side surface and a convex image sensor side surface, a second lens disposed second from the object side has positive refractive power and includes an object side surface and an image sensor side surface, at least one of which is aspherical, and a third lens disposed third from the object side has positive refractive power, and wherein the lens assembly satisfies Conditional Expressions 1, 2, and 3 below, $$N23 \geq 1.6 \qquad \text{[Conditional Expression 1]}$$

$$N7 \geq 1.6 \qquad \text{[Conditional Expression 2]}$$

$$HFOV \geq 50° \qquad \text{[Conditional Expression 3]}$$

wherein "N23" is a refractive index of one of the second lens and the third lens, "N7" is a refractive index of a seventh lens disposed seventh from the object side, and "HFOV" is a half angle of view of the lens assembly in "degrees", wherein a fourth lens disposed fourth from the object side has a thickness in millimeters which is greater than 0.4 and smaller than 0.5, wherein an air gap in millimeters between the fourth lens and a fifth lens disposed fifth from the object side is greater than 0.4 and smaller than 0.5, and wherein the concave object side surface of the first lens has a radius of curvature between −5.1 and −4.8.

2. The lens assembly of claim 1, wherein at least one of the at least seven lenses is configured to perform focus adjustment by moving along the optical axis direction.

3. The lens assembly of claim 1, wherein at least one of an object side surface and an image sensor side surface of the seventh lens includes an inflection point.

4. The lens assembly of claim 3, wherein the image sensor side surface of the seventh lens is concave.

5. The lens assembly of claim 3, wherein at least one of the at least seven lenses is configured to perform focus adjustment by moving along the optical axis direction.

6. The lens assembly of claim 1, wherein the seventh lens has negative refractive power.

7. The lens assembly of claim 1, wherein the second lens has a refractive index of 1.6 or more, and the third lens has a refractive index of 1.6 or less.

8. The lens assembly of claim 1, wherein the lens assembly satisfies Conditional Expressions below, $$N2 \geq 1.6 \qquad \text{[Conditional Expression 4]}$$

wherein "N2" is a refractive index of the second lens.

9. The lens assembly of claim 8, wherein at least one of the at least seven lenses is configured to perform focus adjustment by moving along the optical axis direction.

10. The lens assembly of claim 8, wherein at least one of an object side surface and an image sensor side surface of the seventh lens includes an inflection point.

11. The lens assembly of claim 10, wherein the image sensor side surface of the seventh lens is concave.

12. The lens assembly of claim 10, wherein at least one of the at least seven lenses is configured to perform focus adjustment by moving along the optical axis direction.

13. The lens assembly of claim 8, wherein the seventh lens has negative refractive power.

14. An electronic device comprising:

at least seven lenses sequentially arranged along an optical axis direction from an object side to an image sensor side:

an image sensor aligned with the at least seven lenses on the optical axis direction and configured to receive light focused or guided by the at least seven lenses; and a processor configured to acquire an image based on the light received from the image sensor, wherein a first lens disposed first from the object side has negative refractive power and includes a concave object side surface and a convex image sensor side surface, a second lens disposed second from the object side has positive refractive power and includes an object side surface and an image sensor side surface, at least one of which is aspherical, and a third lens disposed third from the object side has positive refractive power, and wherein the electronic device satisfies Conditional Expressions 7, 8, and 9 below, $$N23 \geq 1.6 \qquad \text{[Conditional Expression 7]}$$

$$N7 \geq 1.6 \qquad \text{[Conditional Expression 8]}$$

$$HFOV \geq 50° \qquad \text{[Conditional Expression 9]}$$

wherein "N23" is a refractive index of one of the second lens and the third lens, "N7" is a refractive index of a seventh lens disposed seventh from the object side, and "HFOV" is a half angle of view of the electronic device in "degrees", wherein a fourth lens disposed fourth from the object side has a thickness in millimeters which is greater than 0.4 and smaller than 0.5, wherein an air gap in millimeters between the fourth lens and a fifth lens disposed fifth from the object side is greater than 0.4 and smaller than 0.5, and wherein the concave object side surface of the first lens has a radius of curvature between −5.1 and −4.8.

15. The electronic device of claim 14, wherein the processor is configured to perform focus adjustment by moving at least one of the at least seven lenses along the optical axis direction.

16. The electronic device of claim 14, wherein at least one of an object side surface and an image sensor side surface of the seventh lens includes an inflection point.

17. The electronic device of claim 16, wherein the image sensor side surface of the seventh lens is concave.

18. The electronic device of claim 16, wherein at least one of the at least seven lenses is configured to perform focus adjustment by moving along the optical axis direction.

19. The electronic device of claim 14, wherein the seventh lens has negative refractive power.

20. The electronic device of claim 14, wherein the second lens has a refractive index of 1.6 or more, and the third lens has a refractive index of 1.6 or less.

* * * * *